United States Patent
Zhou et al.

(10) Patent No.: US 12,366,590 B2
(45) Date of Patent: Jul. 22, 2025

(54) VISUAL INERTIAL ODOMETRY WITH MACHINE LEARNING DEPTH

(71) Applicant: GOOGLE LLC, Mountain View, CA (US)

(72) Inventors: Yunwen Zhou, Belmont, CA (US); Ryan Christopher DuToit, Redwood City, CA (US); Abhishek Kar, Fremont, CA (US); Konstantine Nicholas John Tsotsos, Corte Madera, CA (US); Eric Turner, Somerville, MA (US); Chao Guo, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 580 days.

(21) Appl. No.: 17/648,572

(22) Filed: Jan. 21, 2022

(65) Prior Publication Data

US 2023/0236219 A1 Jul. 27, 2023

(51) Int. Cl.
  *G06K 9/00* (2022.01)
  *G01P 13/00* (2006.01)
  (Continued)

(52) U.S. Cl.
  CPC .............. *G01P 21/00* (2013.01); *G01P 13/00* (2013.01); *G01P 15/08* (2013.01); *G06T 7/20* (2013.01);
  (Continued)

(58) Field of Classification Search
  CPC ........... G06T 7/50; G06T 19/006; G06T 7/80; G06T 2219/2004; G06T 7/33;
  (Continued)

(56) References Cited

U.S. PATENT DOCUMENTS

| | | |
|---|---|---|
| 9,243,916 B2 | 1/2016 | Roumeliotis et al. |
| 9,607,401 B2 | 3/2017 | Roumeliotis et al. |

(Continued)

FOREIGN PATENT DOCUMENTS

| | | |
|---|---|---|
| CN | 110175523 A | 8/2019 |
| CN | 107687850 B | 4/2021 |
| CN | 113203407 A | 8/2021 |

OTHER PUBLICATIONS

M. Li, H. Yu, X. Zheng and A. I. Mourikis, "High-fidelity sensor modeling and self-calibration in vision-aided inertial navigation," 2014 IEEE International Conference on Robotics and Automation (ICRA), Hong Kong, China, 2014, pp. 409-416 (Year: 2014).*

(Continued)

*Primary Examiner* — Gregory A Morse
*Assistant Examiner* — Kevin M Coomber
(74) *Attorney, Agent, or Firm* — Brake Hughes Bellermann LLP

(57) ABSTRACT

Disclosed is a method including receiving a depth map estimated using data based on image and data received from a movement sensor as input, generating an alignment parameter based on the depth map, adding the alignment parameter to a pre-calibration state to define a user operational calibration state, generating scale parameters and shift parameters based on features associated with the data received from the image and movement sensor, and calibrating the image and movement sensor based on the user operational calibration state, the scale parameters and the shift parameters.

20 Claims, 9 Drawing Sheets

(51) Int. Cl.
| | |
|---|---|
| G01P 15/08 | (2006.01) |
| G01P 21/00 | (2006.01) |
| G06T 7/20 | (2017.01) |
| G06T 7/33 | (2017.01) |
| G06T 7/50 | (2017.01) |
| G06T 7/80 | (2017.01) |

(52) U.S. Cl.
CPC ............... *G06T 7/33* (2017.01); *G06T 7/50* (2017.01); *G06T 7/80* (2017.01); *G06T 2207/20084* (2013.01)

(58) Field of Classification Search
CPC . G06T 2207/20084; G06T 7/246; G06T 7/70; G06T 7/20; G06T 7/579; G06T 7/73; G06T 7/269; G01C 21/3804; G01C 25/005; G01C 21/165; G01C 21/16; G01C 21/10; G06V 20/20; G06V 10/82; G01P 21/00; G01P 13/00; G01P 15/08; G06F 18/22; H04N 13/246; G06N 3/08; G06N 20/00
See application file for complete search history.

(56) References Cited

U.S. PATENT DOCUMENTS

| | | | |
|---|---|---|---|
| 9,766,074 | B2 | 9/2017 | Roumeliotis et al. |
| 9,996,941 | B2 | 6/2018 | Roumeliotis et al. |
| 10,670,404 | B2 | 6/2020 | Roumeliotis et al. |
| 11,486,707 | B2 | 11/2022 | Roumeliotis et al. |
| 11,555,903 | B1 * | 1/2023 | Kroeger ................. G05D 1/024 |
| 11,741,631 | B2 * | 8/2023 | Serackis ................ G06T 7/251 382/100 |
| 2018/0208311 | A1 | 7/2018 | Zhang et al. |
| 2021/0004979 | A1 * | 1/2021 | Valentin ................. G06T 7/579 |
| 2021/0142497 | A1 | 5/2021 | Pugh et al. |
| 2021/0343087 | A1 * | 11/2021 | Gomez Gonzalez ... G06F 3/012 |
| 2022/0254121 | A1 * | 8/2022 | Xu .......................... G06T 17/20 |

OTHER PUBLICATIONS

S. Weiss, R. Brockers, S. Albrektsen and L. Matthies, "Inertial Optical Flow for Throw-and-Go Micro Air Vehicles," 2015 IEEE Winter Conference on Applications of Computer Vision, Waikoloa, HI, USA, 2015, pp. 262-269 (Year: 2015).*

Fu, B., Li, F., Zhang, T., Jiang, J., Li, Q., Tao, Q., & Niu, Y. (2019). Single-shot colored speckle pattern for high accuracy depth sensing. IEEE Sensors Journal, 19(17), 7591-7597. (Year: 2019).*

International Search Report and Written Opinion for PCT Application No. PCT/US2022/081691, mailed on Apr. 24, 2023, 14 pages.

Juang, et al., "Online Initialization and Extrinsic Spatial-Temporal Calibration for Monocular Visual-Inertial Odometry", Journal of Latex Class Files, vol. 14, No. 8;, Aug. 2015, 15 pages.

Jung, et al., "Observability Analysis of IMU Intrinsic Parameters in Stereo Visual-Inertial Odometry", IEEE Transactions on Instrumentation and Measurement, vol. 69, No. 10, Oct. 2020, 12 pages.

Wang, et al., "Adaptive Optimization Online IMU Self-Calibration Method for Visual-Inertial Navigation Systems", Measurement vol. 180 (2021) 109478; www.elsevier.com/locate/measurement; https://doi.org/10.1016/j.measurement.2021.109478, 2021, 16 pages.

Hong, et al., "Visual-Inertial Odometry With Robust Initialization and Online Scale Estimation", Sensors, 18, 4287; (www.mdpi.com/journal/sensors), 2018, 18 pages.

* cited by examiner

VISUAL INERTIAL ODOMETRY WITH MACHINE LEARNING DEPTH

FIELD

Embodiments relate to calibrating visual inertial odometry (VIO) (or visual inertial (VI)) systems.

BACKGROUND

Visual inertial odometry (VIO) is used in the augmented reality (AR) and/or virtual reality (VR) industry for providing 6DoF in the AR/VR experience. A variety of systems are used during VIO operation including visual inertial structure from motion, in which it forms a least square problem with a combination of inertial controls and traditional multi-view geometry vision controls on observed feature tracks to estimate VIO states.

SUMMARY

With the advancement of depth map estimation using a neural network, extracting up to scale and shift depth information from an image (e.g., a monocular image, a stereo image) has become practical. In addition, depth can be used for detecting planes, landmarks, and features. Example implementations can use real time deep depth with the systems used for VIO calibration (or visual inertial (VI) calibration). For example, a machine learned (ML) depth can keep the updated scale and shift from relative depth information of each feature point that can be used to generate extra controls for the VIO calibration in order to improve VIO calibration resulting in a robust AR/VR experience.

In a general aspect, a device, a system, a non-transitory computer-readable medium (having stored thereon computer executable program code which can be executed on a computer system), and/or a method can perform a process with a method including receiving a depth map estimated using data based on image and data received from a movement sensor as input, generating an alignment parameter based on the depth map, adding the alignment parameter to a pre to define a user operational calibration state, generating scale parameters and shift parameters based on features associated with the data received from the image and movement sensor, and calibrating the image and movement sensor based on the user operational calibration state, the scale parameters and the shift parameters.

Implementations can include one or more of the following features. For example, the method can further include generating a gradient map based on the depth map and the image data, wherein the alignment parameter is generated based on the gradient map. The depth map can be estimated using a neural network. The calibrating of the image and movement sensor includes spatially aligning and temporally aligning data generated by an image sensor with data generated by a movement sensor. The user operational calibration state can be a visual inertial (VI) calibration state, the movement sensor can be an inertial measurement unit (IMU) sensor, and the VI calibration state can be generated based on IMU sensor data, image data generated by the image sensor, and optical flow measurements associated with the image data. The method can further include one of estimating, by a neural network, a depth based on the image or a set of images and movement sensor data or generating, using an image processing operation, the depth based on one of the image or the set of images, storing the depth in a memory, and selecting the stored depth as the received depth map. The method can further include generating gravity aligned image data by rotating image data based on IMU sensor data, wherein the estimating of the depth uses the gravity aligned image data as input to the neural network or the generating of the depth uses the gravity aligned image data as input to the image processing operation.

For example, the method can further include generating an image plane based on the image data, determining a gravity vector based on the IMU sensor data and the image plane, determining a ground plane vector in an opposite direction of the gravity vector, generating gravity vector parameters based on the gravity vector, generating a ground plane based on the ground plane vector, predicting, by the neural network, a surface normal map including a plurality of pixels representing a surface normal direction in a camera frame, determining a triplet of points in the image plane based on the features associated with the image data, generating a frame plane based on a projection of the triplet of points onto the ground plane, determining a frame plane normal bounded by the surface normal map, generating triplet normal parameters based on the frame plane normal, and modifying the scale parameters and the shift parameters based on the gravity vector parameters and the triplet normal parameters. The depth map can be one of a plurality of depth maps associated with a plurality of image frames, the method can further include performing outlier rejection based on a residual error across the plurality of depth maps.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

Figure 1:
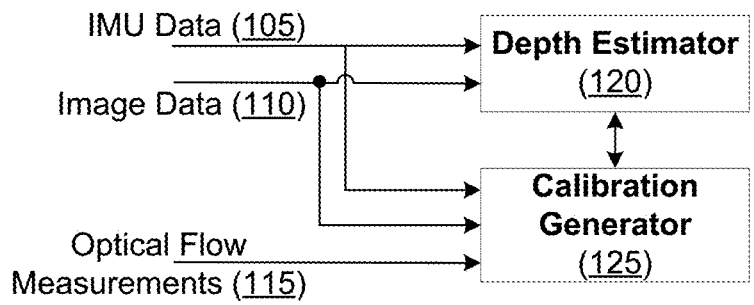
FIG. 1 illustrates a block diagram of a data flow for calibrating a visual inertial odometry system according to an example implementation.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements can be reduced or exaggerated for clarity. The use of similar or identical reference numbers in the various drawings is intended to indicate the presence of a similar or identical element or feature.

DETAILED DESCRIPTION

Visual-inertial odometry (VIO) (sometimes also called visual-inertial (VI) can be used for tracking three-dimensional (3D) position and orientation (pose) using a camera (e.g., monocular camera, a stereo camera, and/or camera sensor(s)) and a movement sensor providing linear acceleration and rotational velocity (e.g., an inertial measurement unit (IMU)). The camera and the movement sensor can be pre-calibrated (e.g., at a manufacturing facility) individually and together as elements of a VIO system. The camera and the movement sensor can be operationally calibrated (sometimes called initialization or optimization) together as elements of the VIO system before and during end user use or operation. The operational calibration is necessary because the pre-calibration may retain some system calibration error(s) and/or noise causing a calculated position and/or orientation to not be accurate enough for use in some applications. The operational calibration should be performed as part of initial use of the device including the VIO system and at times throughout the use of the device including the VIO system. Therefore, the operational calibration may need to be performed when the device including the VIO system is moving a significant amount and when the device including the VIO system is not moving at all (or an insignificant amount. In order to achieve a precise (e.g., minimize the effect of system noise) operational calibration, the VIO system may need to be operating with a minimum amount of movement (e.g., high parallax, variable acceleration). A problem associated with VIO systems is that the VIO system may not be operating with the necessary amount of movement (e.g., stationary car, aerial robot slowly descending, smartphone AR user not gesticulating with phone) for precise operational calibration. Without a precise operational calibration, the pose and orientation estimations during end-user operation can be inaccurate.

A technical solution to this problem is to determine a depth of an image (e.g., RGB image) and/or relative depth between frames (e.g., each RGB keyframe) based on a depth map for each frame that is generated using a neural network. The VIO system can use the depth and/or relative depth to calculate alignment parameters and use the alignment parameters to determine (or help determine) a depth measurement confidence and/or optimize (or help optimize) a calibration state (or initial state) for the VIO system. The calibration state can be an optimal setup for the VIO system to estimate 3D position and orientation (e.g., pose) of objects, landmarks and/or features for tracking of 3D position and orientation of the objects, landmarks and/or features.

The benefit of this system is an improved estimation of calibration values for VIO use during user operation including and accurate calculation (or estimation) of pose during calibration (initialization or optimization) operating during both low movement (e.g., low parallax) and high movement (e.g., high parallax) conditions.

Calibration can occur in several stages with regard to a VIO system. For example, elements of the VIO system (e.g., an IMU) can be calibrated individually prior to being assembled into a VIO system. The VIO system can be calibrated (e.g., at a factory) after assembly. The VIO system can be calibrated as a first or initial step (e.g., at startup) when operated by a user. The VIO system can be calibrated continually throughout use when operated by a user. The state of the VIO system can be referred to herein as a pre after calibration by the factory. The state of the VIO system can be referred to herein as a user operational calibration state when calibrated as an initial step when operated by a user and when calibrated continually throughout use when operated by a user.

FIG. 1 illustrates a block diagram of a data flow for calibrating a visual inertial odometry (VIO) system according to an example implementation. A device (e.g., mobile device, head mounted display) including a VIO system (e.g., an AR/VR device, a robot, and the like) can be received (e.g., purchased) by a user with the VIO system having been pre-calibrated at, for example, the manufacturing and/or assembly facility. Accordingly, the VIO system can be in a pre. However, as mentioned above, the pre-calibration of the VIO system may retain some calibration error(s) in the VIO system. Therefore, the VIO system can be calibrated before (e.g., on startup) and during use of the device, including the VIO system.

Figure 3:
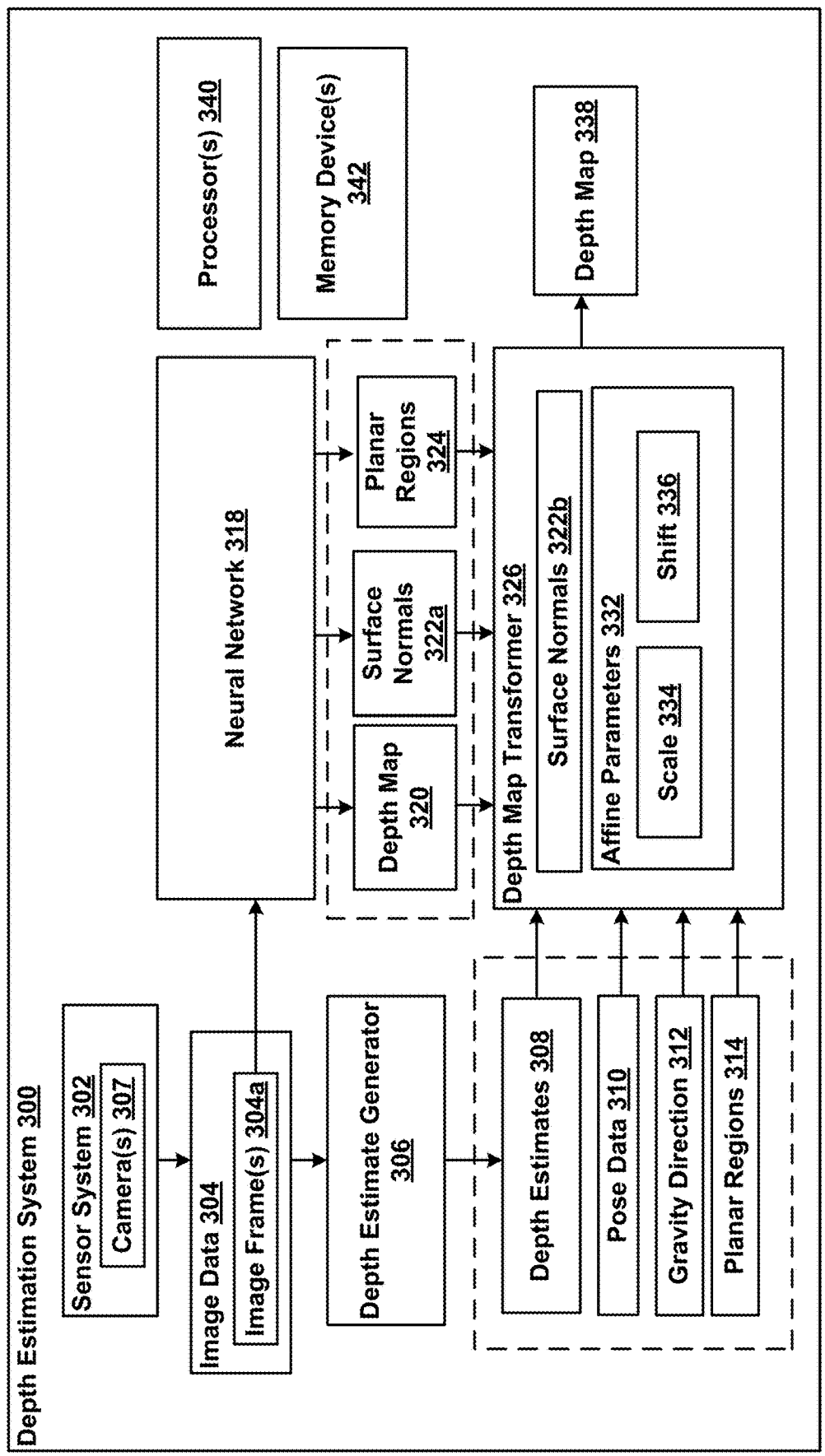
FIG. 3 illustrates a block diagram of a depth estimation system according to an example implementation.

The user operational calibration can modify and/or optimize the pre-calibration state to generate a user operational calibration state that can remove and/or minimize the effect of the error(s) remaining in the VIO system after pre-calibration. The calibration of the VIO system illustrated in FIG. 1 can be configured to receive an image (e.g., RGB image) and determine a depth of the image. The depth can be used to modify and/or optimize the pre (e.g., while operating) as the user operational calibration state. As shown in FIG. 1, the VIO system calibration data flow includes an IMU data 105 block, an image data 110 block, an optical flow measurements 115 block, a depth estimator 120 block (an example implementation of the depth estimate 120 is shown in FIG. 3), and a calibration generator 125 block.

The IMU data 105 can include linear acceleration data and rotational velocity data. The IMU data 105 can correspond to data generated by an inertial motion unit (IMU). The IMU can detect motion, movement, and/or acceleration of a device (e.g., a mobile device, an AR/VR device, a robot, a computing device, and/or the like). The IMU can include various different types of sensors such as, for example, an accelerometer, a gyroscope, a magnetometer, and other such sensors. The IMU data 105 can include data generated, sensed or captured by any type of sensor including, for example, a light sensor, an audio sensor, a distance and/or proximity sensor, a contact sensor such as a capacitive sensor, a timer, and/or other sensors and/or different combination(s) of sensors.

The image data 110 can include data representing a plurality of pixels captured, sensed or obtained by a camera. The image data 110 can include data representing a scene or real-world scene as captured, sensed or obtained by the camera. The camera can be an element of the VIO system. The camera can be an element of a device including the VIO system. The image data 110 can be received from a storage system external to the device including the VIO system. The image data 110 can be of a first format (e.g., YUV) and can be converted to a second format (e.g., RGB), or vice-versa, based on the format used by the VIO system. The IMU data 105 and the image data 110 can be associated with image frames captured by an AR/VR device.

The optical flow measurements 115 can include data representing motion of individual pixels on an image plane. Optical flow can be defined as the distribution of apparent velocities of movement of brightness patterns in an image. Therefore, optical flow can be associated with frame-to-frame measurements of, for example, an estimation of motion as either instantaneous image velocities or discrete image displacements. The frame-to-frame images can be associated with the same camera(s) as the image data 110 and/or a different camera(s) as the image data 110. The optical flow measurements 115 can include data representing moving objects and can delineate independently moving objects in the presence of camera motion. The optical flow measurements 115 can include data representing the motion of a scene context (e.g., background, foreground, fixed objects, moving objects, ground plane, image plane, and/or the like) relative to an observer. The optical flow measurements 115 can include data representing a pattern of apparent motion of objects, surfaces, and edges in a visual scene caused by the relative motion between an observer and a scene.

The depth estimator 120 can be configured to infer depth and/or relative depth from the image data 110 (e.g., each RGB keyframe in a sequence of images). The inferred or estimated depth can be used by the calibration generator 125 in, for example, a calibration operation that can modify a pre to define a user operational calibration state. The depth estimator 120 can be configured to generate a depth map based on depth estimates (obtained from one or more sources) and/or a depth map generated by a neural network. The depth maps can be used in a VIO calibration, modification, optimization, and/or the like system, process, operation, and/or the like. The VIO calibration (or VI calibration) can be referred to as a calibration state (or VI calibration state) and/or a user operational calibration state. Depth estimates (e.g., metric depth estimates) can be associated with the image data 110. The depth estimates can include depth values in a metric scale for some of the pixels in the image data 110. For example, the metric scale can refer to any type of measurement system such as the metric system and/or the imperial system. The depth estimates can be considered sparse depth estimates (e.g., depth estimates for some of the pixels in the image data but not all of them). For example, if an image includes one hundred pixels, the depth estimates can include depth estimates in a metric scale for a subset of the pixels. In contrast, a dense depth map can include depth values (e.g., non-metric depth values) for a large number of pixels in the image or all of the pixels in the image.

The calibration generator 125 can be configured to modify a pre-calibration state to define a user operational calibration state. The pre can be a calibration state generated during the manufacture of the VIO system (and/or elements thereof). The user operational calibration state can be an optimal calibration state of the VIO system performed before and/or during use of the VIO system in, for example, an AR/VR device. The calibration generator 125 can be configured to use a visual-inertial structure-from-motion (VI-SFM) problem with relative depth constraints from the estimated depth (e.g., inferred monocular depth). The VI-SFM problem can estimate keyframe poses, velocity, and calibration states (e.g., the user operational calibration state), which are then used as the initial condition for a full VIO system. The VIO calibration can consist of a closed-form solver (e.g., an algorithm with a finite number of operations), whose solution is then refined with visual-inertial bundle adjustment (VI-BA).

Figure 2:
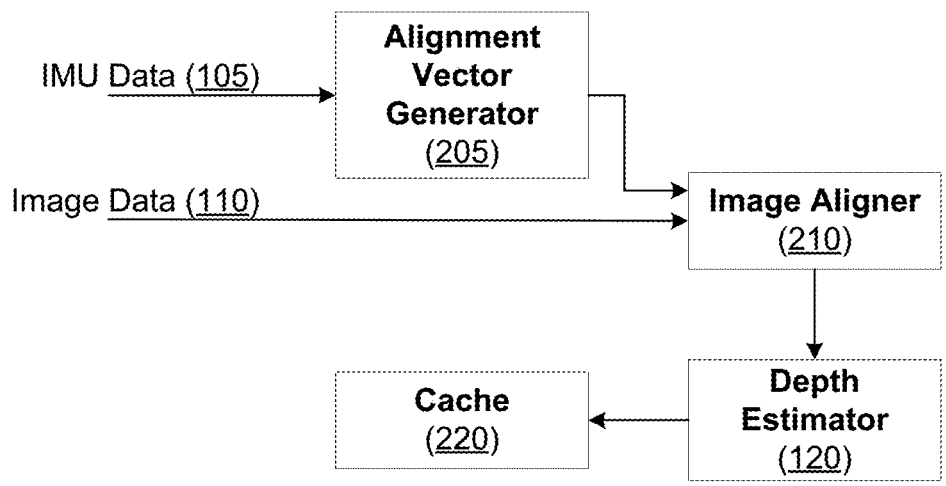
FIG. 2 illustrates a block diagram of a data flow for estimating depth according to an example implementation.

The IMU data 105 can include accelerometer data. Referring to FIG. 2, the accelerometer data can be used to infer a gravity vector that is associated with an image timestamp. The image (e.g., at the associated timestamp and corresponding to the image data 110) can be aligned to gravity aligned using the inferred gravity vector. The neural network can be trained for predicting depth for the gravity-aligned image (e.g., the aligned image can appear upright as opposed to appearing sideways). After the inference, an estimated depth can be stored in memory (e.g., a cache memory) for the calibration generator 125 to query during a VIO calibration process.

FIG. 2 illustrates a block diagram of a data flow for estimating depth (including the depth estimator 120) according to an example implementation. As shown in FIG. 2, the depth estimation flow includes the IMU data 105 block, the image data 110 block, an alignment vector generator 205 block, an image aligner 210 block, the depth estimator 120, and a cache 220 block.

The image data 110 can be captured by a camera of, for example, an AR/VR device. The camera can be in any orientation (e.g., any pitch, yaw, and/or roll). Therefore, the image can be in any orientation. The depth estimator 120 can be configured to use image data 110 (representing an image in any orientation) in a desired orientation. Therefore, in an example implementation, image data 110 can be reoriented to the desired orientation of the depth estimator 120. The alignment vector generator 205 can be configured to determine a gravity direction, gravity normal, and/or gravity vector. The gravity direction can be determined based on accelerometer data included in the IMU data 105. The image aligner 210 can be configured to rotate the image (e.g., pixels) associated with the image data 110. The rotated image (or rotated image data) can be a gravity-aligned image.

The depth estimator 120 can be further configured to generate an estimated depth based on the gravity-aligned image (or image data). The cache 220 can be configured to store the estimated depth. The depth estimates (or gravity-aligned depth estimates), pose data, gravity direction, and/or the like be can be retrieved from the cache 220 during an AR/VR session executable by an AR/VR application. The AR/VR application can be installed on (and executable by) a computing device (e.g., a mobile computing device). In an example implementation, in combination with other components of a depth estimation system, the AR/VR application can be configured to detect and track a device's position relative to the physical space to obtain the pose data, detect the size and location of different types of surfaces (e.g., horizontal, vertical, angled) to obtain the planar regions, obtain a gravity direction from accelerometer data (e.g., IMU data 105), and generate the depth estimates (e.g., by depth estimator 120).

Returning to FIG. 1, in order to accurately determine the pose data, detect the size and location of different types of surfaces (e.g., horizontal, vertical, angled) to obtain the planar regions using a VIO system, the calibration generator 125 can calibrate the VIO system using the neural network generated depth as estimated using the depth estimator 120.

FIG. 3 further describes a depth estimation system (e.g., as depth estimator 120 and/or including depth estimator 120).

$$\hat{X} = \underset{X}{\operatorname{argmin}} \underbrace{\sum_{(i,j) \in \mathcal{K}} \|r_{T_{ik}}\|^2_{\Sigma_{ij}}}_{\text{Inertial Constraints}} + \underbrace{\sum_{i \in \mathcal{F}} \sum_{k \in \mathcal{K}} \rho(\|r_{\mathcal{F}_{ik}}\|^2_{\Sigma_{\mathcal{F}}})}_{\text{Visual Constraints}} +$$

$$\underbrace{\sum_{i \in \mathcal{L}} \sum_{k \in \mathcal{K}} \lambda_{ik} \rho(\|r_{\mathcal{L}_{ik}}\|^2)}_{\text{Mono-Depth Constraints}} + \underbrace{\|r_0\|^2_{\Sigma_o} + \sum_{i \in \mathcal{K}} \|r_{S_i}\|^2_{\Sigma_S}}_{\text{Prior Constraints}}$$

Prior to describing the depth estimation system, an example implementation of VIO including visual-inertial structure-from-motion (SfM) calibration will be mathematically described. During calibration, classic SfM calibration can be less than accurate due to insufficient system motion during the calibration. Example implementations can improve the accuracy of the SfM calibration by incorporating a machine learning-based measurement including depth estimation as an input. For example, learned monocular depth images (mono-depth) can be used to constrain the relative depth of features, and upgrade the mono-depth to metric scale by jointly optimizing for the relative depth scale and shift.

VIO (or monocular VIO) can enable accurate tracking of metric 3D position and orientation (pose) using just a monocular camera (e.g., an optical device that magnifies distant objects) and inertial measurement unit (IMU) providing linear acceleration and rotational velocity. VIO SfM algorithms can generate estimates for key system parameters such as scale, starting velocity, accelerometer and gyro biases, starting pose windows, and starting gravity direction. Errors in these states can lead to transient effects or failures, preventing reliable and accurate pose estimation. Under low parallax scenarios, any classical depth estimation approach for these features, the VI-SFM can be susceptible to large uncertainty. This uncertainty can make the overall system ill-conditioned, often resulting in poor or failed calibration. This ambiguity can be exacerbated if the inertial measurements lack enough variation to reliably recover metric scale. Example implementations use a feature-based VIO relying on sparse (e.g., a minimum set of) visual feature tracks to constrain relative pose (up to scale) in visual-inertial structure-from-motion (VI-SFM) for calibration. For example, incorporating depth measurements from a learned mono-depth model directly into a classical VI-SFM framework as measurements can result in a more accurate VIO calibration.

Example implementations use learned monocular depth priors for VIO calibration. Example implementations use a residual function that couples scale and shift invariant monocular depth measurements within a traditional VI-SFM formulation. Example implementations use a gradient-based residual weighting function and an outlier rejection module to effectively deal with noisy depth predictions. In example implementations the calibrating of the image and movement sensor includes spatially aligning and temporally aligning data generated by an image sensor with data generated by a movement sensor. The data can include, for example, position and orientation states relative to a gravity-aligned coordinate frame of the data from the image and movement sensors.

Example implementations use monocular depth inference which infers (relative) depth from each RGB keyframe, and a VIO calibration (sometimes called initialization) module which forms a visual-inertial structure from—motion (VI-SFM) problem, with the relative depth constraints from the inferred monocular depth (see FIGS. 1 and 2). This VI-SFM can be configured to estimate keyframe poses, velocity, and calibration states (e.g., user operational calibration state), which are then used as the initial condition for a full VIO system. The VIO calibration can consist of a closed-form solver, whose solution is then refined with visual-inertial bundle adjustment (VI-BA).

Example implementations can incorporate prior (algorithmically preferring one predictor over another sometimes using a prediction boundary) driven depth (e.g., monocular depth) constraints within a classical VIO calibration framework (e.g., a model, a research informed model, and the like) for better tracking. For example, the depth (or mono-depth) model can include monocular depth estimation models and train a lightweight mono-depth network. Example implementations can use a scale-shift invariant loss with edge-sensitive depth loss(es) and train a model (e.g., a UNet model) on a variety of datasets and use pseudo-ground truth disparity maps generated on a dataset using large pretrained models. For datasets with metric depth ground truth, example implementations can add a metric depth loss term (e.g., Charbonnier loss between prediction and inverse metric depth) to inform the scale and shift priors in Eq. (5) below. Given the scale-shift invariant nature of the training losses, the metric inverse depth, z, can be expressed as a scaled and shifted version of the model prediction, d, as z=ad+b, where a and b are the scale and shift parameters respectively.

Moreover, as the model is trained on gravity aligned (e.g., as in FIG. 2) images, the input image can be rotated in 90-degree increments before inferring depth. 45-degree accuracy may be required to get the best rotation, therefore accelerometer measurements rotated through precalibrated IMU-camera extrinsics can be used as an estimate of gravity in the camera frame. Example implementations can include obtaining, generating, using, modifying, optimizing, and/or a calibration state (e.g., pre-calibration state, user operational calibration state, and the like) including, at least, the following state parameters, X, in a VI-BA model, algorithm, framework, and/or the like.

$$\chi = [X_0; \ldots; X_{N-1}; C_{f_0}; \ldots; C_{f_{M-1}}; S_0; \ldots; S_{N-1}] \quad (1)$$

where:

$X_k$ represents the $k^{th}$ IMU keyframe state among N keyframes in total, which is $[q_k; p_k; v_k; b_k^a; b_k^\omega]$. $q_k$ and $p_k$ are the $k^{th}$ IMU keyframe pose parameterized as quarternion and translation with respect to the global frame {G} in which the direction of gravity is known and/or assumed. $v_k$ is the velocity in {G} and $b_k^a; b_k^\omega$ are the accelerometer and gyro biases at the $k^{th}$ keyframes;

$C_f f_i$ represents the $i^{th}$ feature point parameterized in local inverse depth $[u_{ij}; v_{ij}; w_{ij}]^T$ with respect to the $j^{th}$ keyframe's camera coordinates. $u_{ij}$ and $v_{ij}$ lie on normalized image XY plane and $w_{ij}$ is the inverse depth; and $S_k = [a_k; b_k]$ are scale and shift for recovering metric depth from the raw mono-depth at the $k^{th}$ keyframe.

The IMU-camera extrinsics ($q_C$, $p_C$) and 3D-2D projection parameters Proj(·) are not estimated due to lack of information in such a small calibration window. Therefore, default pre-calibrated values can be used. The state X can be initialized using a standard closed-form solver for a VI-SFM formulated with reprojection error. Given keyframes K, with up to scale and shift mono inverse depth, feature points F, and L(⊂F) feature points with mono inverse depth measurements, the VI-BA can minimize the following objective function:

$$\hat{X} = \underset{X}{\arg\min} \underbrace{\sum_{(i,j)\in\mathcal{K}} \|r_{\mathcal{I}_{ij}}\|^2_{\Sigma_{ij}}}_{\text{Inertial Constraints}} + \underbrace{\sum_{i\in\mathcal{F}}\sum_{k\in\mathcal{K}} \rho(\|r\mathcal{F}_{ik}\|^2_{\Sigma_{\mathcal{F}}})}_{\text{Visual Constraints}} + \qquad (2)$$

$$\underbrace{\sum_{l\in\mathcal{L}}\sum_{k\in\mathcal{K}} \lambda_{ik}\rho(\|r\mathcal{L}_{ik}\|^2)}_{\text{Mono-Depth Constraints}} + \underbrace{\|r_0\|^2_{\Sigma_0} + \sum_{i\in\mathcal{K}} \|rS_i\|^2_{\Sigma_S}}_{\text{Prior Constraints}}$$

where:
$r_{\mathcal{I}_{ij}}$ is the IMU pre-integration residual error corresponding to IMU measurements between two consecutive keyframes; $r_{F_{ik}}$ is the standard visual reprojection residual resulting from subtracting a feature-point's pixel measurement from the projection of fi into the $k^{th}$ keyframe; $r_{\mathcal{L}_{ik}}$ is an inverse depth temporal consistency residual for incorporating mono-depth, and $r_{s_i}$ is a residual relative to a prior for scale and shift; $r_0$ is a prior for the bias estimates of the 0th keyframe; and $\Sigma_{ij}$, $\Sigma_F$, $\Sigma_S$ are the corresponding measurement covariance matrices. $\lambda_{ik}$ is a scalar weight for each depth residual and $\rho(\cdot)$ refers to the huber-loss function.

Depth constraints can relate observed feature-point depth with that keyframe's scale-shift parameters, Sk. Therefore, only two (2) additional parameters may be needed to model the hundreds of mono-depth residual equations for each keyframe-landmark pair. This can reduce estimation uncertainty in calibration during ill-conditioned scenarios with a small baseline. The depth constraints can include three components—the residual function, the weight for each residual, and the outlier rejection module to reject inconsistent mono-depth measurements across keyframes.

An inverse depth residual function can be based on the loss functions employed in monocular deep depth estimation. In an example implementation, the depth residual for keyframe k and feature point i can take the form of the log of the ratio between the measured depth scaled/shifted by Sk and the feature point's estimated depth:

$$r_{\mathcal{L}_{ik}} = \log((a_k d_{ik} + b_k) \cdot \Omega(^{C_j} f_i, q_j, p_j, q_k, p_k)) \qquad (3)$$

where $\Omega(\cdot)$ is the depth of the feature point i (which is parameterized with respect to keyframe j) in keyframe k.

If k=j, then $\Omega(\cdot)$ can be simplified to $w_{ij}^{-1}$. This can tie mono-depth parameters to multiple features and poses to better constrain the model. This residual can lead to a degenerate solution of scale going to zero or a negative value. To avoid this, the scale parameter $a_k$ can be defined as:

$$a_k = \varepsilon + \log(e^{s_k} + 1) \qquad (4)$$

where $\varepsilon = 10^{-5}$, which prevents $a_k$ from being either negative or zero, allowing us to optimize $s_k$ freely.

A scale-shift prior can include training the ML model on certain metric depth datasets with a loss where the scale is supposed to be 1 and shift is 0. The prior residuals for scale and shift at the $i^{th}$ frame can be defined as:

$$r_{s_i} = [1 - a_i - b_i]^T \qquad (5)$$

The prior with a very large covariance $\Sigma_S$ can be assigned to these scale-shift priors to keep parameters bounded to the regime in which model training occurred. In degenerate situations such as zero-acceleration, the prior can allow convergence to a sensible scale. The learned depth can be adjusted to the metric level using the scale-shift prior and the large covariance. The ML model may not explicitly yield prediction uncertainty. However, the empirically observed uncertainty can be larger near depth edges and a loss weight, $\lambda_{ik}$ or edge awareness weight, can be configured to modulate the residual with gradients of image $I_k$ and depth $D_k$ as follows:

$$\lambda_{ik} = e^{-(|\nabla^2 \phi(I_k(u_{ik}, v_{ik}))| + |\nabla^2 \phi(D_k(u_{ik}, v_{ik}))|)} \qquad (6)$$

where
$\nabla 2$ is the laplacian operator;
$\Phi(\cdot)$ is a bilateral filter for sharpening image and depth edges;
$\alpha$ is a hyperparameter for relative weighting of image/depth gradients; and
$(u_{ik}; v_{ik})$ is the pixel location of the feature point in keyframe k.

This weight can diminish or reduce the effect of depth constraints on feature points near image/depth edges and can favor non-edge regions where the depth and image gradients are in agreement. The weighting function eqn. (6) can help mitigate the effects of erroneous mono-depth measurements at a given keyframe. However, the weighting function cannot reconcile inconsistency in depth measurements across keyframes. For a short calibration window (<2s), keyframe images tend not to vary drastically. Given this, the mono-depth output may not vary significantly as well (even though they are up to an unknown scale and shift). For example, if the mono-depth model predicts a feature point to have small depth with respect to the rest of the scene in one keyframe but large depth in another, the mono-depth residuals for this given feature can be unreliable and should not be included in the final optimization. In order to minimize this, an outlier rejection technique can be used which is described in more detail below. The outlier rejection technique can be configured to reject mono-depth residuals based on a variance in pixel values between two of the plurality of depth maps. Returning now to depth estimation using FIG. 3.

FIG. 3 illustrates a block diagram of a depth estimation system according to an example implementation. The depth estimation system 300 can be configured to generate a depth map 338 based on depth estimates 308 (obtained from one or more sources) and a depth map 320 generated by a neural network 318. The depth map 320 generated by the neural network 318 can have a first scale. In an example implementation, the first scale is a non-metric scale. The depth map 338 can have a second scale. The first scale and the second scale can be based on two different measurement systems with different standards. In an example implementation, the second scale is a metric scale. The depth estimation system 300 can be configured to convert the depth map 320 having the first scale to the depth map 338 having the second scale. The depth maps 338 with the second scale can be used to control augmented reality, robotics, natural user interface technology, gaming, or other applications. In an example implementation, the depth maps 338 can be used in a VIO calibration, initialization, optimization, and/or the like system, process, operation, and/or the like. The VIO calibration (or VI calibration) can be referred to as a calibration state (or VI calibration) and/or a user operational calibration state.

The depth estimation system 300 includes a sensor system 302 configured to obtain image data 304. The sensor system 302 can include one or more cameras 307. In an example implementation, the sensor system 302 includes a single camera 307. In an example implementation, the sensor system 302 includes two or more cameras 307. In an example implementation, the sensor system 302 and/or the one or more cameras 307 can be external (e.g., in a separate module within a larger system, e.g., an AR/VR device) to the depth estimation system 300 and the depth estimation system 300 can receive image data (e.g., image data 110) from the external sensor system 302 and/or the external one or more cameras 307. The external sensor system 302 and/or the external one or more cameras 307 can be configured to communicate the image data (e.g., image data 110) to the depth estimation system 300 as image data 304.

The sensor system 302 can be configured to generate, sense, obtain, and/or the like linear acceleration data and rotational velocity data. The sensor system 302 can include an inertial motion unit (IMU). The IMU can detect motion, movement, and/or acceleration of a device (e.g., a mobile device, an AR/VR device, a robot, a computing device, and/or the like). The IMU can include various different types of sensors such as, for example, an accelerometer, a gyroscope, a magnetometer, and other such sensors. The sensor system 302 can include other types of sensors such as a light sensor, an audio sensor, a distance and/or proximity sensor, a contact sensor such as a capacitive sensor, a timer, and/or other sensors and/or different combination(s) of sensors. In an example implementation, the IMU can be external (e.g., in a separate module within a larger system, e.g., an AR/VR device) to the depth estimation system 300 and the depth estimation system 300 can receive IMU data (e.g., IMU data 105) from the external IMU. The external IMU can be configured to communicate the IMU data (e.g., IMU data 105) to the depth estimation system 300.

The depth estimation system 300 includes one or more processors 340, which can be formed in a substrate configured to execute one or more machine executable instructions or pieces of software, firmware, or a combination thereof. The processors 340 can be semiconductor-based, that is the processors can include semiconductor material that can perform digital logic. The depth estimation system 300 can also include one or more memory devices 342. The memory devices 342 can include any type of storage device that stores information in a format that can be read and/or executed by the processor(s) 340. The memory devices 342 can store applications and modules that, when executed by the processor(s) 340, perform any of the operations discussed herein. In some examples, the applications and modules can be stored in an external storage device and loaded into the memory devices 342. The one or more processors 340 and/or the one or more memory devices 342 can be shared devices. In other words, the one or more processors 340 and/or the one or more memory devices 342 can be elements of a larger system (e.g., a mobile device, an AR/VR device, a robot, a computing device, and/or the like) configured to share resources between modules including, for example, the depth estimation system 300.

The neural network 318 can be configured to generate a depth map 320 based on the image data 304 captured by the sensor system 302. In an example implementation, the neural network 318 receives an image frame 304a of the image data 304 and generates the depth map 320 based on the image frame 304a. The image frame 304a can be a red-green-blue (RGB) image (or in another format (e.g., YUV) that is converted to RGB). In an example implementation, the neural network 318 can be configured to generate a depth map 320 using a single image frame 304a. In an example implementation, the neural network 318 can be configured to generate a depth map 320 using two or more image frames 304a. The depth map 320 generated by the neural network 318 can be an affine-invariant depth map, which is a depth map that is up to scale/shift but is not associated with a first scale (e.g., a metric scale).

A depth map 320 can refer to an image where each pixel represents the depth value according to a non-metric scale (e.g., 0 to 1) for the corresponding pixel in the image. The non-metric scale can be a scale that is not based on the metric system, the international system of units (SI), or the imperial system of measurement. Although the example implementations are described with reference to metric scale (or metric value) and non-metric scale (or non-metric scale), the first and second scale can be based on any two different measurement systems with different standards. The depth map 320 can be used to describe an image that contains information relating to the distance from a camera viewpoint to the surface of an object in the scene. The depth value can be inversely related to the distance from a camera viewpoint to the surface of an object in the scene.

The neural network 318 can be any type of deep neural network configured to generate a depth map 320 using one or more image frames 304a (or a single image frame 304a). In an example implementation, the neural network 318 is a convolutional neural network. In an example implementation, the neural network 318 is considered a monocular depth neural network because the neural network 318 predicts a depth map 320 based on a single image (e.g., monocular) frame 304a. The neural network 318 can be configured to predict pixel-wise depth from the image frame 304a. In an example implementation, the neural network 318 includes a U-net architecture (e.g., an encoder-decoder with skip connections with learnable parameters).

In an example implementation, the neural network 318 can have a size that is configured to execute on a computing device (e.g., a mobile device, a smartphone, a tablet, an AR/VR device, a robot, and/or the like). In an example implementation, the size of the neural network 318 can be somewhat small (e.g., around, or less than 70 Mb 100 Mb, 150 Mb, and the like). In an example implementation, the neural network 318 uses depth-wise separable convolutions, which is a form of factorized convolutions that factorize a standard convolution into a depthwise convolution and a 1×1 convolution referred to as a pointwise convolution. This factorization can have the effect of reducing computation and model size. In an example implementation, the neural network 318 can use a Blurpool encoder, which can be a combined anti-aliasing and subsampling operation that makes the network more robust and stable to corruptions such as rotation, scaling, blurring, and noise variants. In some examples, the neural network 318 can include bilinear upsampling, which can reduce the parameters to transposed convolutions and therefore reduces the size of the network.

In an example implementation, the neural network 318 can be configured to predict surface normals 322a that can describe surface orientation of the image frame 304a (e.g., all visible surfaces in the scene). In an example implementation, the surface normals 322a include per-pixel normals or per-pixel surface orientation. In an example implementation, surface normals 322a include surface normal vectors. A surface normal 322a for a pixel in an image can be defined as a three-dimensional (3D) vector corresponding to orientation of the 3D surface represented by that pixel in the real world. The orientation of the 3D surface can be represented by a directional vector perpendicular to the real-world 3D surface. In an example implementation, the neural network 318 can be configured to detect planar regions 324 within the image frame 304a. The planar regions 324 can include vertical and/or horizontal planes.

The depth estimation system 300 can include a depth estimate generator 306 that obtains depth estimates 308 (e.g., metric depth estimates) associated with the image data 304. The depth estimates 308 can include depth values in a metric scale for some of the pixels in the image data 304. For example, the metric scale can refer to any type of measurement system such as the metric system and/or the imperial system. The depth estimates 308 obtained by the depth estimate generator 306 can be considered sparse depth estimates (e.g., depth estimates for some of the pixels in the image data but not all of them). For example, if an image frame 304a is 10×10, the image frame 304a can include one hundred pixels. However, the depth estimates 308 can include depth estimates in a metric scale for a subset of the pixels. In contrast, a dense depth map (e.g., depth map 320) provides depth values (e.g., non-metric depth values) for a large number of pixels in the image or all of the pixels in the image).

The depth estimate generator 306 can be any type of component configured to generate (or obtain) depth estimates 308 based on the image data 304. In an example implementation, the depth estimate generator 306 also obtains pose data 310 and identifies planar regions 314 within the image data 304. The pose data 310 can identify a pose (e.g., position and orientation) of a device that executes the depth estimation system 300 (e.g., an AR/VR device, a robot, a smartphone, and/or the like that has the depth estimation system 300). In an example implementation, the pose data 310 includes a five degree-of-freedom (DoF) position of the device. In an example implementation, the pose data 310 includes a six DoF position of the device. In an example implementation, the depth estimate generator 306 includes a plane generator 705 configured to detect planar regions 314 within the image data 304 using any type of planar detection algorithm (or plane fitting algorithm). A planar region 314 can be a planar surface of an object (e.g., table, wall, etc.) within the image data 304.

Figure 4:
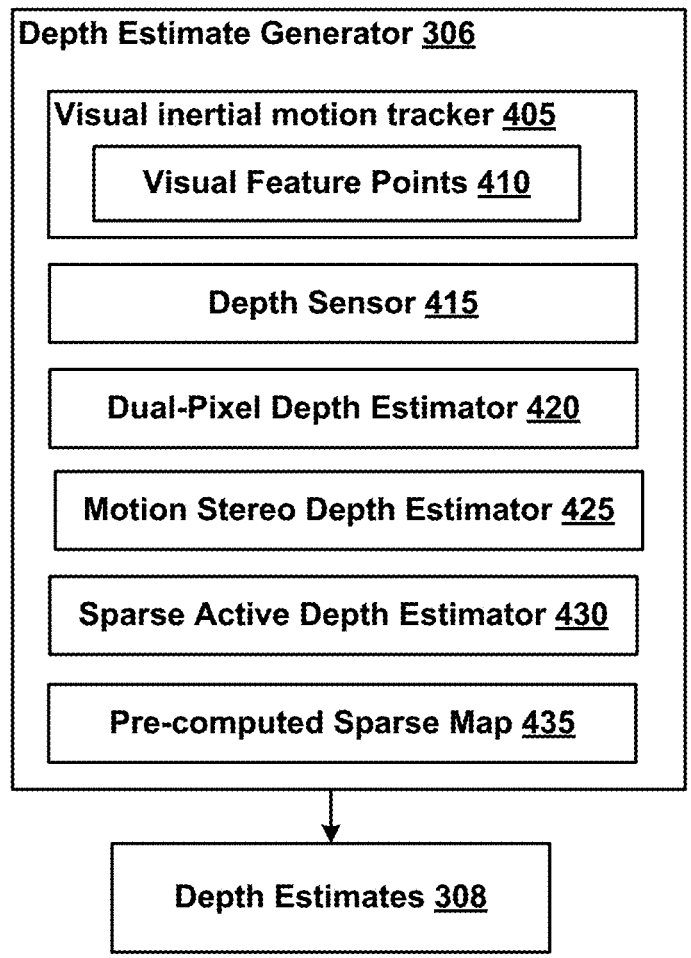
FIG. 4 illustrates a block diagram of a depth estimate generator that obtains depth estimates according to an example implementation.

Referring to FIG. 4 the depth estimate generator 306 can include a visual inertial motion tracker 405, a depth sensor 415, a motion stereo depth estimator 425, a sparse active depth estimator 430, and/or a pre-computed sparse map 435. Each of the components of the depth estimate generator 306 can represent a separate source for obtaining depth estimates 308. For example, each component can independently generate depth estimates 308, where the depth estimate generator 306 can include one component or multiple components. In an example implementation, the depth estimate generator 306 can include one source, e.g., one of the visual inertial motion tracker 405, the depth sensor 415, the dual-pixel depth estimator 420, the motion stereo depth estimator 425, the sparse active depth estimator 430, or the pre-computed sparse map 435. In an example implementation, if the depth estimate generator 306 includes multiple sources (e.g., multiple components), the depth estimate generator 306 can be configured to select one of the sources for use in generating the depth map 338. In an example implementation, if the depth estimate generator 306 includes multiple sources (e.g., multiple components), the depth estimate generator 306 can be configured to select multiple sources for use in generating the depth map 338.

The visual inertial motion tracker 405 can be configured to generate visual feature points 410 that represent the image data 304. The visual feature points 410 can be associated with depth estimates 308. For example, each visual feature point 410 can include a depth value in a metric scale. Visual feature points 410 can be generated by the visual inertial motion tracker 405 using the image data 304 representing a real-world scene (e.g., as captured by a camera during an AR/VR session). A visual feature point 410 can include a depth value in a metric scale, where the depth value is inversely related to the distance from a camera viewpoint to the surface of an object in the scene.

The visual feature points 410 can be a plurality of points (e.g., points of interest) in 3D space that represent the user's environment. In an example implementation, each visual feature point 410 includes an approximation of a fixed location and orientation in 3D space, and the visual feature points 410 can be updated over time. For example, the user can move her mobile phone's camera around a scene during which the visual inertial motion tracker 405 can generate visual feature points 410 that represent the scene. In an example implementation, the visual feature points 410 include simultaneous localization and mapping (SLAM) points. In an example implementation, the visual feature points 410 are referred to as a point cloud. In an example implementation, the visual feature points 410 are referred to as feature points. In an example implementation, the visual feature points 410 are referred to 3D feature points. In an example implementation, the visual feature points 410 are in a range of 200-400 per image frame 304a.

The depth sensor 415 can be configured to generate the depth estimates 308 based on the image data 304. In an example implementation, the depth sensor 415 includes a light detection and ranging (LiDAR) sensor. The dual-pixel depth estimator 420 can use a machine learning model to estimate depth from the camera's dual-pixel auto-focus system. Dual-pixels operate by splitting every pixel in half, such that each half pixel views a different half of the main lens' aperture. By reading out each of these half-pixel images separately, two slightly different views of the scene are obtained, and these different views can be used by the dual-pixel depth estimator 420 to generate the depth estimates 308. The motion stereo depth estimator 425 can be configured to use multiple images in a stereo-matching algorithm for generating the depth estimates 308. In an example implementation, a single camera can be moved around a scene to capture multiple images, where these images can be used to stereo match to estimate a metric depth. The sparse active depth estimator 430 can include a sparse time of flight estimator or sparse phase detection autofocus (PDAF) estimator. In some examples, the pre-computed sparse map 435 is a sparse map used by a visual positioning service.

Referring back to FIG. 3, the depth estimation system 300 can include a depth map transformer 326 configured to transform the depth map 320 generated by the neural network 318 to a depth map 338 using the depth estimates 308. A depth map 338 can refer to an image where each pixel represents the depth value according to a metric scale (e.g., meters) for the corresponding pixel in the image data 304. The depth map transformer 326 is configured to use the depth estimates 308 to provide a metric scale for the depth map 320 generated by the neural network 318.

The depth map transformer 326 can be configured to estimate affine parameters 332 based on the depth map 320 generated by the neural network 318 and the depth estimates 308. The affine parameters 332 include scale 334 and shift 336 of the depth map 320. The scale 334 includes a scale value that indicates the amount of resizing of the depth map 320. The shift 336 includes a shift value indicating the amount that the pixels of the depth map 320 are shifted. It is noted that the scale 334 (or scale value) refers to the amount of sizing, which is completely different from the above-recited "first scale" and "second scale" which refers to different measuring systems (e.g., first scale can be a non-metric scale and second scale can be a metric scale).

The depth map transformer 326 can be configured to transform the depth map 320 to the depth map 338 using the affine parameters 332. In some examples, the scale 334 and the shift 336 include two numbers (e.g., s=scale, t=shift) which when multiplied and added to the value in each pixel at depth map 320 produce depth map 338 (e.g., D138 (x, y)=s*D120 (x, y)+t), where D120(x, y) is the value in depth map 320 at the pixel location (x, y)). The affine parameters 332 can be estimated from a sparse set of depth estimates 308 and then applied to every pixel in the depth map 320 using the above equation. As depth map 320 has valid depth for all pixels, depth map 338 will also have metrical scale for all pixels.

The depth map transformer 326 can be configured to execute a parameter estimation algorithm to solve an optimization problem (e.g., an objective function) which minimizes an objective of aligning the depth estimates 308 with the depth map 320. In other words, the depth map transformer 326 can be configured to minimize an objective function of aligning the depth estimates 308 with the depth map 320 to estimate the affine parameters 332. For example, as indicated above, the depth estimates 308 obtained by the depth estimate generator 306 can be considered sparse depth estimates (e.g., depth estimates for some of the pixels in the image data 304 but not all of them). For example, if an image frame 304a is 10×10, the image frame 304a includes one hundred pixels. The depth estimates 308 can include depth estimates in a metric scale for a subset of the pixels in the image frame 304a (e.g., some number less than one hundred in the example of the 10×10 image).

However, the depth map 320 can include a depth value for each pixel in the image, where the depth value is a non-metric unit such as a number between zero and one. For each pixel that has a metric depth estimate 308 (e.g., a metric depth value), the depth map transformer 326 can obtain the corresponding depth value in the depth map 320 (e.g., non-metric depth value) and use the metric depth value and the non-metric depth value to estimate the scale 334 and the shift 336, which can include minimizing the error when scale 334 times the non-metric depth value plus shift 336 minus the metric depth value is zero. In some examples, the depth map transformer 326 is configured to solve a least squares parameter estimation problem within a random sample consensus (RANSAC) loop to estimate the affine parameters 332.

Figure 5:
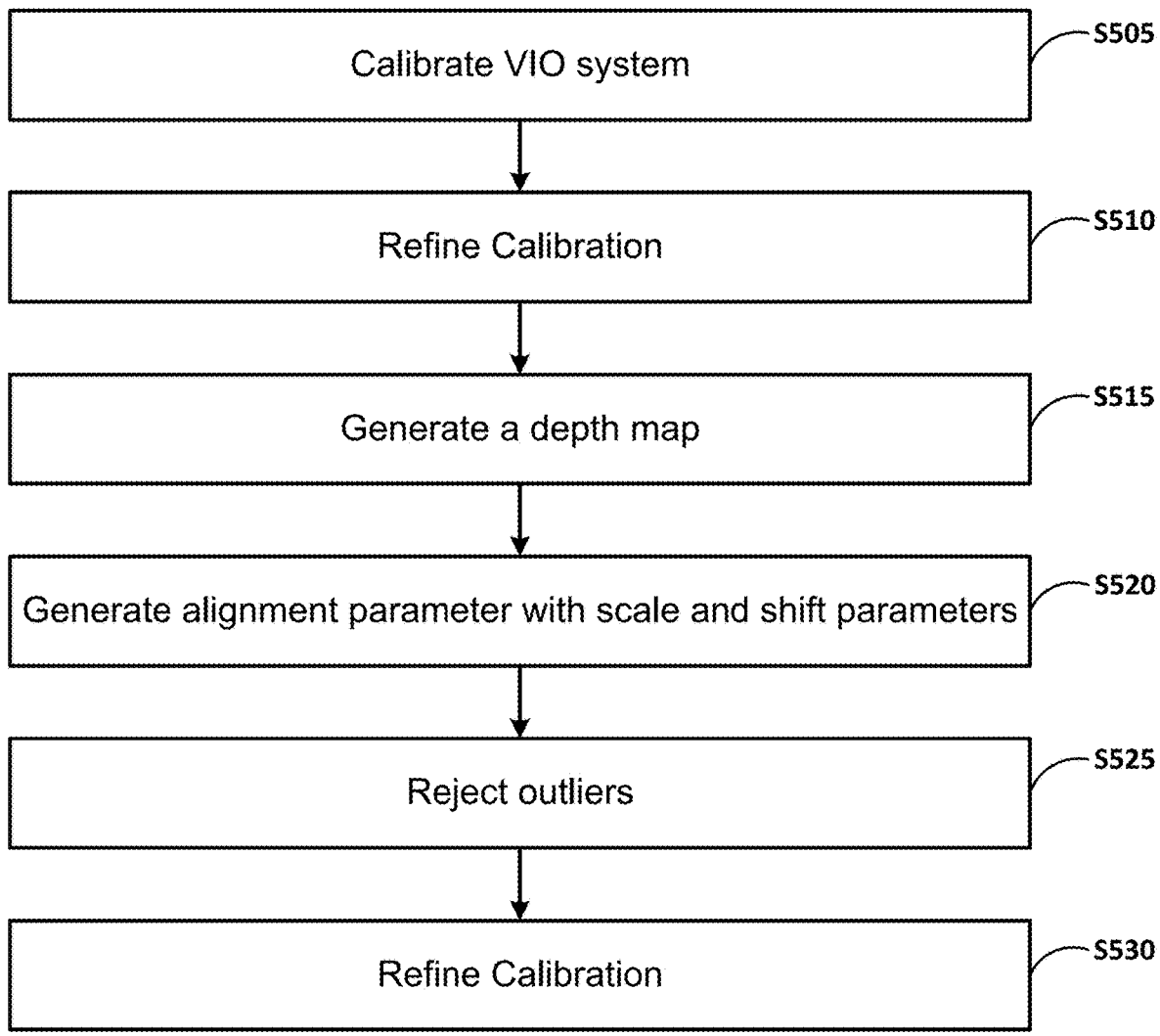
FIG. 5 illustrates a block diagram of a method for calibrating a visual inertial odometry system according to an example implementation.

FIG. 5 illustrates a block diagram of a method for calibrating a visual inertial odometry system according to an example implementation. As shown in FIG. 5, in step S505 a VIO system is calibrated. For example, the VIO system can be calibrated by calibrating individual elements or components of the VIO system. For example, the VIO system can be calibrated by calibrating the VIO system as a system including the interactions between the individual elements or components of the VIO system. For example, the VIO system (and/or elements or components) can be pre-calibrated (e.g., at a manufacturing facility) and/or operationally calibrated (sometimes called initialization or optimization) as a system before and during end user use or operation. Calibration can remove and/or minimize errors and/or noise associated with the VIO system. The errors can be a fixed and/or constant bias offset and/or structural offset and noise can be random signal and/or measurement variations. For example, a fixed bias and/or structural offset in an acceleration measurement can be that the measurement always measures 0.1 m/s$^2$ higher than the measurement should. In eqn. 1, $X_k$ can represent the initial state, initial calibration state or pre. The pre can be met using a closed-form solver for a VI-SFM problem formulated with reprojection error (see eqn. 2). The pre can include inertial constraints, visual constraints, depth constraints, and prior constraints.

In step S510 a calibration is refined. For example, one or more parameter(s) can be added to the pre to define a user operational calibration state. The additional parameter(s) can correct for possible errors included in the pre. The errors can include a fixed and/or constant bias offset and/or structural offset and noise can be random signal and/or measurement variations. In an example implementation, two (2) parameters can be used to reduce depth estimation (e.g., as applies to depth constraints) estimation uncertainty in calibration, especially during ill-conditioned scenarios with small baseline. In an example implementation, the one or more parameter(s) can be an alignment parameter, a scale parameter and/or a shift parameter (see eqns. 3-5).

In step S515 a depth map is generated. For example, the depth map can be estimated using a neural network as described above. The neural network (neural network model, machine learned model, and/or the like) can be (or be based on) a UNet, CNN, Deep network, reinforcement learning, and/or the like. The depth map can be based on a single image, two images (or frames) and/or a plurality of images (or frames). For example, the depth map can be a gradient map calculated or generated based on depths associated with two images (or frames) and/or a plurality of images (or frames). The image(s) can be captured using one or more cameras. For example, the image(s) can be captured using a monocular camera and/or a stereo camera.

In step S520 alignment parameter with scale and shift parameters is generated. For example, the alignment parameter can be generated using the depth map (e.g., a depth map estimated using a neural network) and/or a gradient map. In an example implementation, the gradient map can be used to indicate a confidence (e.g., likelihood of being correct) in the alignment parameter and/or depth measurements. The alignment parameter can be (see eqn. 3) associated with a depth residual for a keyframe and feature point. The alignment parameter can be of the form of a log of the ratio between a scaled/shifted measured depth a feature point's estimated depth. The scale and shift parameters can be the scale/shift (e.g., as described by eqn. 4). The scale and shift parameters can also be applied to the prior constraints (e.g., as described by eqn. 5).

In step S525 outliers are rejected. For example, the depth model can predict a feature point to have a small depth with respect to the rest of the scene in one keyframe and a large depth in another frame, the depth residuals for this feature can be unreliable and should not be included in the final optimization. These unreliable features can be referred to as outliers and should be rejected (e.g., removed) from consideration. Outlier rejection is described in more detail below.

In step S530 the calibration is refined. For example, the pre-calibration state can be re-calibrated using the closed-form solver for the VI-SFM problem formulated with reprojection error (see eqn. 2). In an example implementation, the refined calibration state can be a user operational calibration state if the VIO system is used in a device and the device is being operated by a user.

The weighting function eqn. (6) can help mitigate the effects of erroneous mono-depth measurements at a given keyframe. However, the weighting function cannot reconcile inconsistency in depth measurements across keyframes. For a short calibration window (<2s), keyframe images tend not to vary drastically. Given this, the mono-depth output may not vary significantly as well (even though they are up to an unknown scale and shift). For example, if the mono-depth model can predict a feature point to have small depth with respect to the rest of the scene in one keyframe but large depth in another, the mono-depth residuals for this given feature can be unreliable and should not be included in the final optimization.

Therefore, an outlier-rejection scheme (pseudocode in Algorithm 1 below) first evaluates the standard deviations of residuals involving a feature point, $\sigma_\mathcal{L} = \{\sigma_i, \forall_i \in \mathcal{L}\}$. Then depending on the distribution of $\sigma_\mathcal{L}$ an inlier set can be chosen. If the $25^{th}$ percentile of $\sigma_\mathcal{L}$ is larger than a maximum threshold, all mono-depth constraints can be rejected. This scenario can occur when the ML inference is unstable and does not yield useful constraints. When mono-depth constraints are generally self-consistent (the $85^{th}$ percentile of $\sigma_\mathcal{L}$ is smaller than a minimum threshold) all mono-depth constraints can be accepted. In all other cases, residuals corresponding to $\sigma_i$ in upper $15^{th}$ percentile of $\sigma_\mathcal{L}$ can be rejected, removing the least self-consistent constraints. In an example implementation, outlier rejection can be based on a residual error (e.g., from or given by eqn. 3) across a plurality of depth maps Example implementation can use an estimate of camera pose and feature position to evaluate $r_{\mathcal{L}ik}$ for input to Algorithm 1. Therefore, the VI-BA is first solved without mono-depth. Finally, after convergence of the depth-less cost-function, the depth constraints can be added to eqn. (2).

---

Algorithm 1

Outlier Depth Measurements Rejection

---

Input: Mono-depth residuals $r_{\mathcal{L},i,k}$, $i \in \mathcal{L}$, $k \in \mathcal{K}$; thresholds $\sigma_{min}$, $\sigma_{max}$
Output: Set of inlier mono-depth residuals
1: $\sigma_\mathcal{L} \leftarrow \{\}$
2: for $i \in \mathcal{L}$ do
3:
$$\text{Append } \sigma_i = \sqrt{\frac{\sum_k (r_{ik} - \hat{r}_i)}{N-1}} \text{ to } \sigma_\mathcal{L}$$
4: end for
5: if percentile($\sigma_\mathcal{L}$, 25) > $\sigma_{max}$ then
   return $\{\}$
6: else if percentile($\sigma_\mathcal{L}$, 85) < $\sigma_{min}$ then
   return $\{r_{\mathcal{L},i,k}, \forall i \in \mathcal{L}, \forall k \in \mathcal{K}\}$
7: else
   return $\{r_{\mathcal{L},i,k} | \sigma_i < \text{percentile}(\sigma_\mathcal{L}, 85)\}$
8: end if

---

Figure 6:
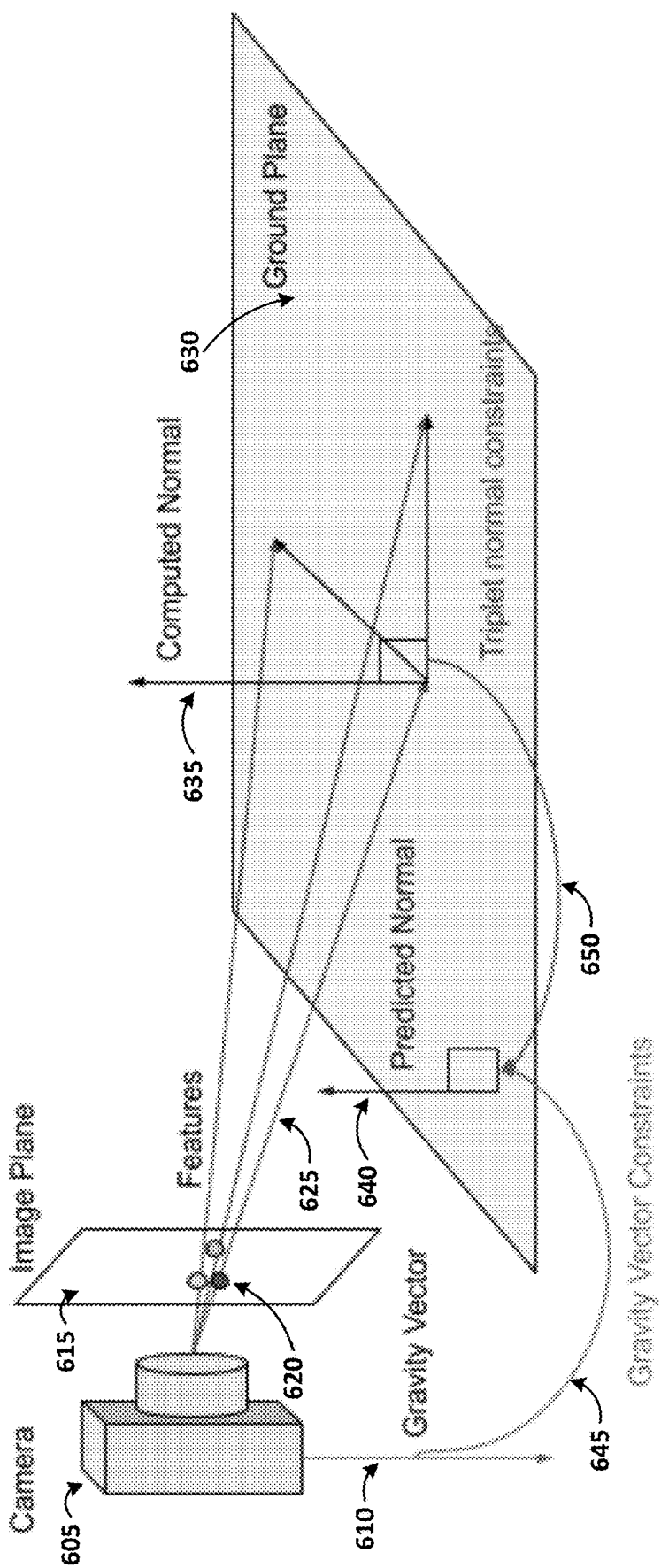
FIG. 6 illustrates an illustration of planes used in a calibration of a visual inertial odometry system according to an example implementation.

FIG. 6 illustrates an illustration of planes used in a calibration of a visual inertial odometry system according to an example implementation. Plane 615 and plane 630 can be used in outlier rejection. At least one of plane 615 and plane 630 can be generated using the plane generator of FIG. 7. The image or image data used to generate image plane 615 and/or ground plane 630 can be captured by camera 605.

Figure 7:
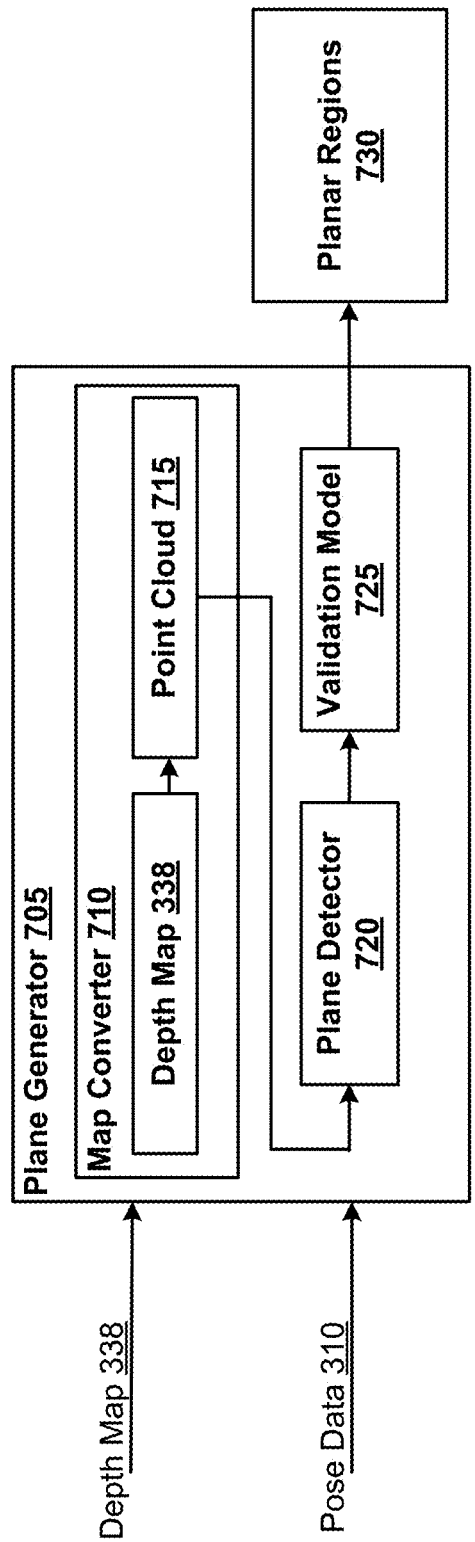
FIG. 7 illustrates a plane generator configured to detect one or more planar regions in image data from a depth map according to an example implementation.

FIG. 7 illustrates a plane generator configured to detect one or more planar regions in image data from a depth map according to an example implementation. The plane generator 705 shown in FIG. 7 can be configured to use a metric depth map 338 to detect or identify one or more planar regions 730 (e.g., metric planar region(s)). For example, the location and size of the planar region 730 may be identified by information according to a metric scale. In an example implementation, the plane generator 705 is included within the depth estimation system 300 of FIG. 3 and may include any of the details discussed with reference to those figures. A metric planar region may be a planar surface of an object within an image with a metric scale. In some examples, the plane generator 705 may receive the metric depth map 338 and pose data 310 and detect one or more planar regions 730 from the metric depth map 338.

Affine ambiguity may cause difficulties for some applications that require (or benefit from) real-word scales. For example, a mobile AR/VR application may involve placing virtual objects in the camera view with real-world dimensions. However, to render objects at real-world scale estimating the depth of the surface on which a virtual object is placed in metric units can be required. According to the implementations discussed herein, the metric depth map 338 (e.g., generated by the depth estimation system 300 of FIG. 3) can be used to estimate at least one planar region 730 in the image data (e.g., image data 304), where the at least one planar region 730 is configured to be used as a surface to attach a virtual object. By using the metric depth maps 338, the latency for detecting planar regions 730 can be reduced. For example, the depth estimation system (e.g., depth estimation system 300 of FIG. 3) can be configured to reduce placement latency by predicting the scale of placed object/ planar surface depth using the convolutional neural network (e.g., estimate depth from a single image or a small number of images thereby requiring less movement by the user). Furthermore, the depth estimation system can be configured to predict depth from low texture surfaces such as white tables.

The plane generator 705 can include a map converter 710 configured to convert the metric depth map 338 to a point cloud 715. The plane generator 705 can include a plane detector 720 that executes a plane fitting algorithm configured to detect one or more planar regions 730 using the point cloud 715. The plane generator 705 can include a validation model 725 configured to process the planar regions 730, which may reject one or more planar regions 730 based on visibility and other constraints.

Returning to FIG. 6, camera 605 can have an associated gravity vector 610. The gravity vector 610 can be a vector (distance and direction) corresponding to a distance and direction of movement that would result in the camera being perpendicular (90 degrees) in relation to a surface representing the ground. The gravity vector 610 can be or can be determined using the gravity direction 312. The gravity vector 610 can be used to determine one or more gravity vector constraints 645.

A number of feature points 620 on the image plane 615 can be projected (represented by rays 625) onto the ground plane. The feature points 620 can be randomly selected. A plane (approximately equal to the ground plane and not shown) and computed normal 635 can be computed based on the projection of the feature points 620 (approximately onto the ground plane 630). The computed normal 635 can be used to determine one or more triplet normal constraints 650.

During depth estimation, surface normals associated with a ground plane can be predicted. For example, depth estimation system 300 can be configured to generate or predict surface normals 322a, 322b. Surface normal 322a, 322b can include a plurality of normals associated with pixels of the plane (e.g., ground plane 630). The triplet normal constraints 650 and the gravity vector constraints 645 can be used to constrain (e.g., provide a bounds or limit the range of possible) surface normals 322a, 322b that can be the predicted normal 640 of the ground plane 630. The predicted normal 640 can be used as a depth constraint for VIO calibration (or VI calibration).

For example, referring to FIG. 3, the depth map transformer 326 may use one or more other signals to assist with providing a metric scale for the depth map 320 generated by the neural network 318. In an example implementation, the neural network 318 may predict surface normals 322*a*, and the depth map transformer 326 may use the predicted surface normals 322*a* along with the depth estimates 308 to determine a metric scale for the depth map 320 generated by the neural network 318. For example, the depth map transformer 326 may predict surface normals 322*b* from the depth map 338 and use the offset between the surface normals 322*b* predicted from the depth map 338 and the surface normals 322*a* predicted from the neural network 318 to assist with determining the affine parameters 332. For example, the depth map transformer 326 may minimize the objective function which can penalize the offset between the depth map 320 and the depth estimates 108 and the offset between the surface normals 322*a* predicted from the neural network 318 and the surface normals 322*b* predicted from the depth map 338.

Figure 8:
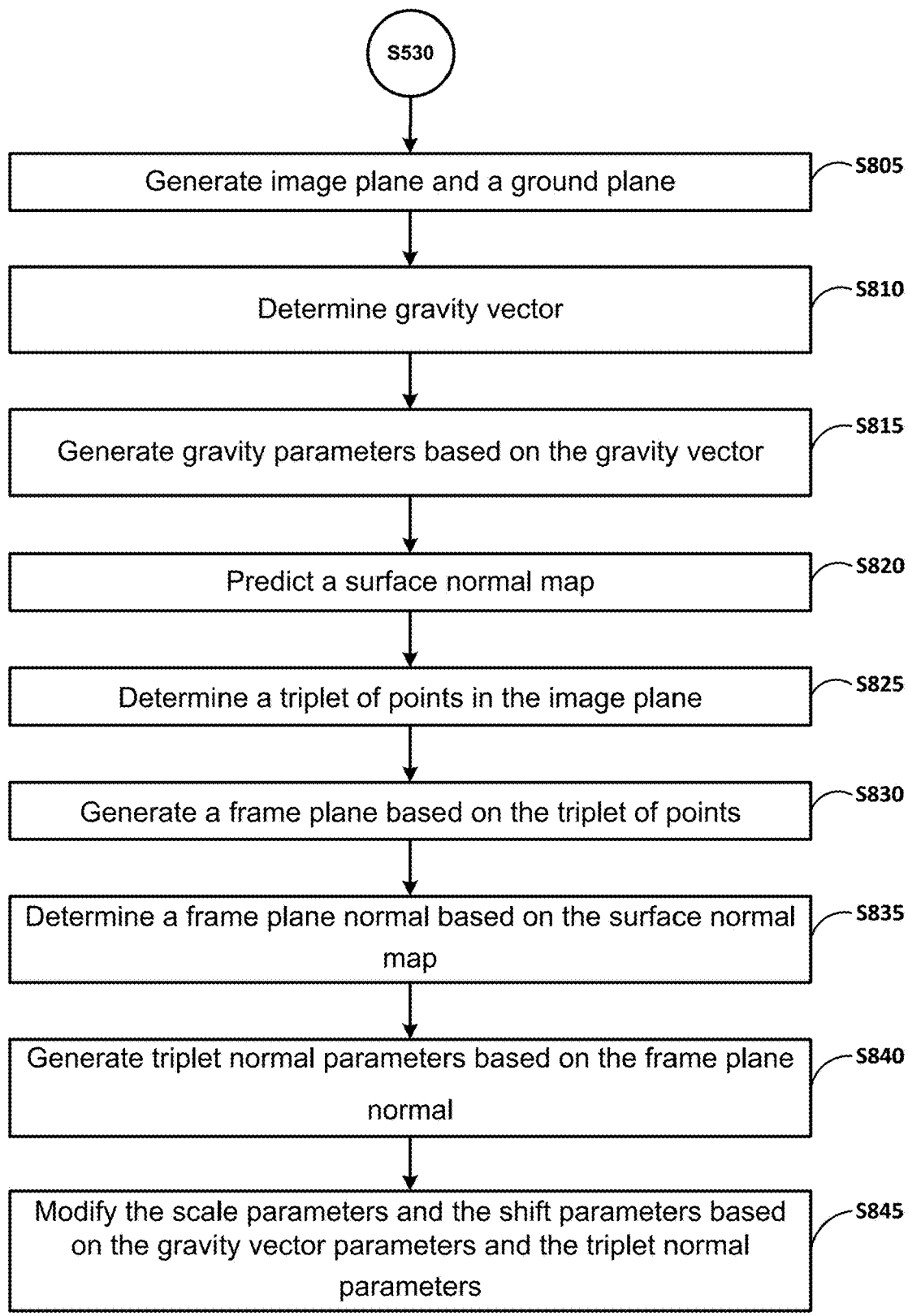
FIG. 8 illustrates a block diagram of a method for calibrating a visual inertial odometry system according to an example implementation.

In an example implementation, the depth map transformer 326 receives a gravity direction 312 and/or planar regions 314. The depth map transformer 326 is configured to use the gravity direction 312 and the planar regions 314 (along with the depth estimates 308) to provide a metric scale for the depth map 320 generated by the neural network 318. The gravity direction 312 may be obtained from an accelerometer. The planar regions 314 may be detected from the image data 304. In an example implementation, the planar regions 314 may be estimated using the visual feature points (e.g., feature points 620) (e.g., the SLAM points). For example, a plane detection algorithm (or plane fitting algorithm) that detects planar regions 314 in the image data 304 can be used to predict the planar regions 314. Using the gravity direction 312 and the planar regions 314, the depth map transformer 326 may minimize the objective function which can penalize the surface normals 322*b* in the horizontal surface regions to match the gravity direction 312 (or opposite of gravity direction 312 depending on the coordinate system). FIG. 8 describes using the normal in a calibration operation.

FIG. 8 illustrates a block diagram of a method for calibrating a visual inertial odometry system according to an example implementation. The method can be a method for calibration using depth and a surface normal (e.g., predicted normal 640). The method of FIG. 8 can begin after the step S530 of FIG. 5. As shown in FIG. 8, in step S805 an image plane and a ground plane are generated. For example, the image plane and the ground plane can be predicted as an operation during the depth estimation (as discussed above). The planar regions 314 can include the image plane (e.g., image plane 615) and the ground plane (e.g., ground plane 630).

In step S810 a gravity vector is determined. For example, the gravity vector can be based on a gravity direction included in the IMU data (e.g., IMU data 105) and the image plane. The gravity vector can be based on the gravity direction 312 and the planar regions 314. For example, the gravity vector can be a direction and magnitude associated with the difference between the gravity direction 312 and a direction associated with the image plane of the planar regions 314.

In step S815 gravity parameters are generated based on the gravity vector. For example, the gravity parameters can be constraints (e.g., gravity vector constraints 645) based on the gravity vector. The gravity parameters can provide a bounds and/or a limit the range of possible values.

In step S820 a surface normal map is predicted. For example, the surface normal map can be predicted as an operation during the depth estimation (as discussed above). The surface normal map can be a plurality of normals associated with the ground plane 630. The surface normal map can be included in or one of the surface normals 322*a*, 322*b*.

In step S825 a triplet of points in the image plane is determined. For example, the triplet of points can be randomly selected as points (e.g., pixels or features) in the image plane. The triplet of points can be feature points 620 and the image plane can be image plane 615.

In step S830 a frame plane is generated based on the triplet of points. For example, the triplet of points can be projected (e.g., represented by rays 625) in the direction of (or onto) the ground plane. The frame plane can be computed based on the projection of the triplet of points. The frame plane can approximate the ground plane predicted during depth estimation.

In step S835 a frame plane normal is determined based on the surface normal map. For example, a normal in the frame plane (e.g., computed normal 635) can be computed that corresponds to each of the normal in the surface normal map. The frame plane normal and the corresponding surface normal are not necessarily equivalent.

In step S840 triplet normal parameters are generated based on the frame plane normal. For example, the computed normals can be used to determine one or more constraints. The triplet normal parameters can provide a bounds and/or a limit to the range of possible selected values. The triplet normal parameters can be the triplet normal constraints 650.

In step S845 the scale parameters and the shift parameters are modified based on the gravity vector parameters and the triplet normal parameters. For example, the gravity vector parameters and the triplet normal parameters can be used to constrain the possible normals in the surface normal map that can be selected as a predicted normal. The predicted normal can then be used to determine the scale parameters and the shift parameters (described above) that can be used in a calibration (initialization, or optimization).

Figure 9:
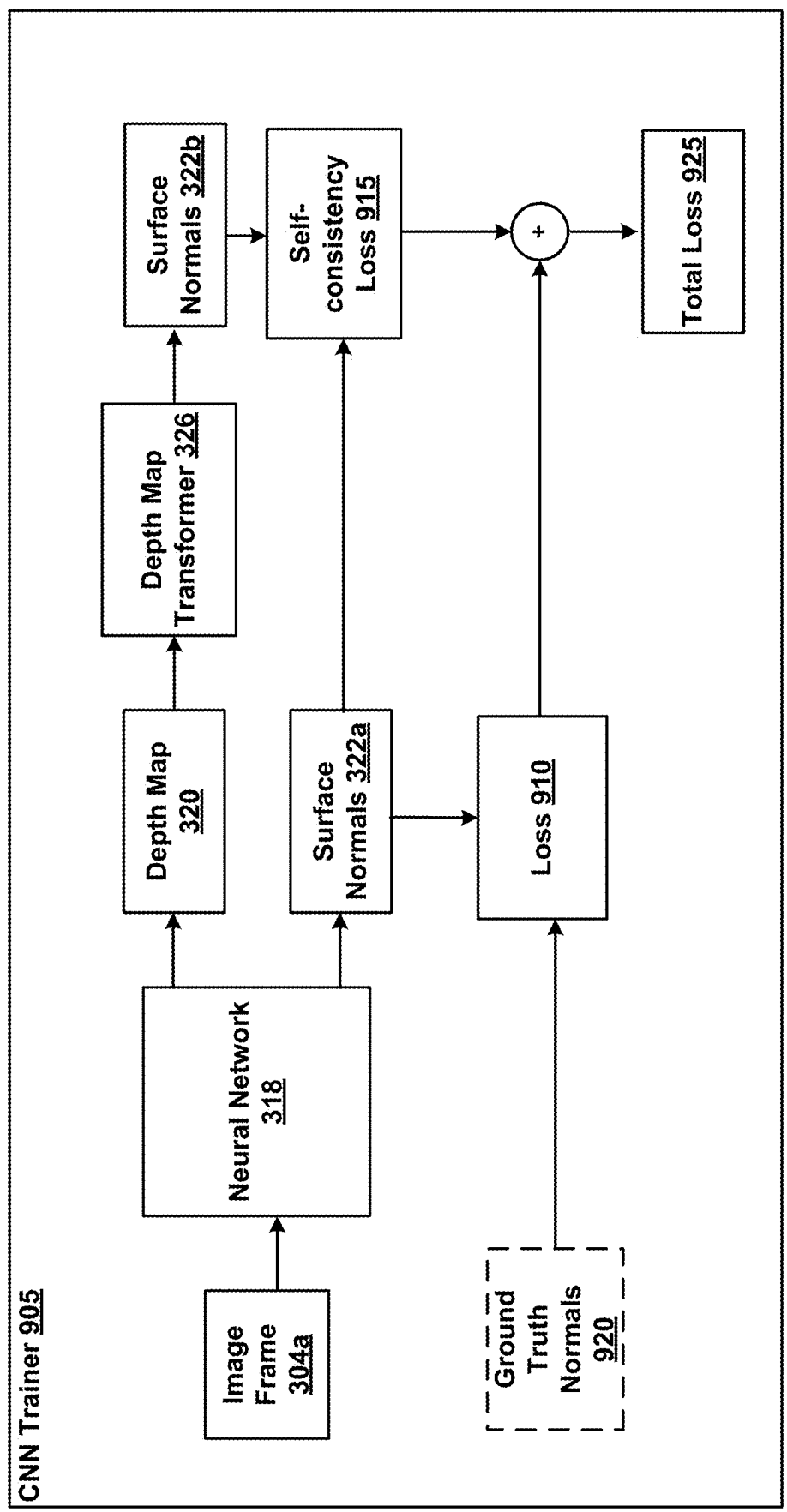
FIG. 9 illustrates a block diagram of a neural network trainer according to an example implementation.

FIG. 9 illustrates a block diagram of a neural network trainer according to an example implementation. As shown in FIG. 9, the depth estimation system 300 can include a convolutional neural network (CNN) trainer 905 configured to train and/or update the neural network 318. In an example implementation, the accuracy of the depth map 338 can be improved by predicting depth and surface normals 322*a*. Surface normals (e.g., surface normals 322*a*, 322*b*) may be viewed as a higher order structural prior, because all pixels belonging to the same 3D plane will have the same normal but not necessarily the same depth. Therefore, by training neural network 318 to also predict surface normals 322*a*, the neural network 318 is trained to reason/infer higher order knowledge about planes in a scene. This can result in smoother depth for planar regions in the scene, where virtual objects are usually placed.

To encourage consistency between predicted depths and surface normals 322*a*, a self-consistency loss 915 (e.g., an unsupervised self-consistency loss) can be used during the training of the neural network 318. For example, the neural network 318 can be configured to predict (estimate, compute, or calculate) the depth map 320 and the surface normals 322*a* from the image frame 304*a*, and the depth map transformer 326 can be configured to predict the surface normals 322*b* from the depth map 338. The self-consistency loss 915 can be computed based on the difference between the surface normals 322*a* and the surface normals 322*b*. A loss 910 (e.g., a supervised loss) can be computed based on the difference between the surface normals 322*a* and ground truth normals 920. A total loss 925 can be computed based on the loss 910 and the self-consistency loss 915 (e.g., the loss 910 is added to the self-consistency loss 915). The self-consistency loss 915 can encourage the neural network 318 to minimize any deviation between the surface normals 322*a* and the surface normals 322*b*.

Figure 10:
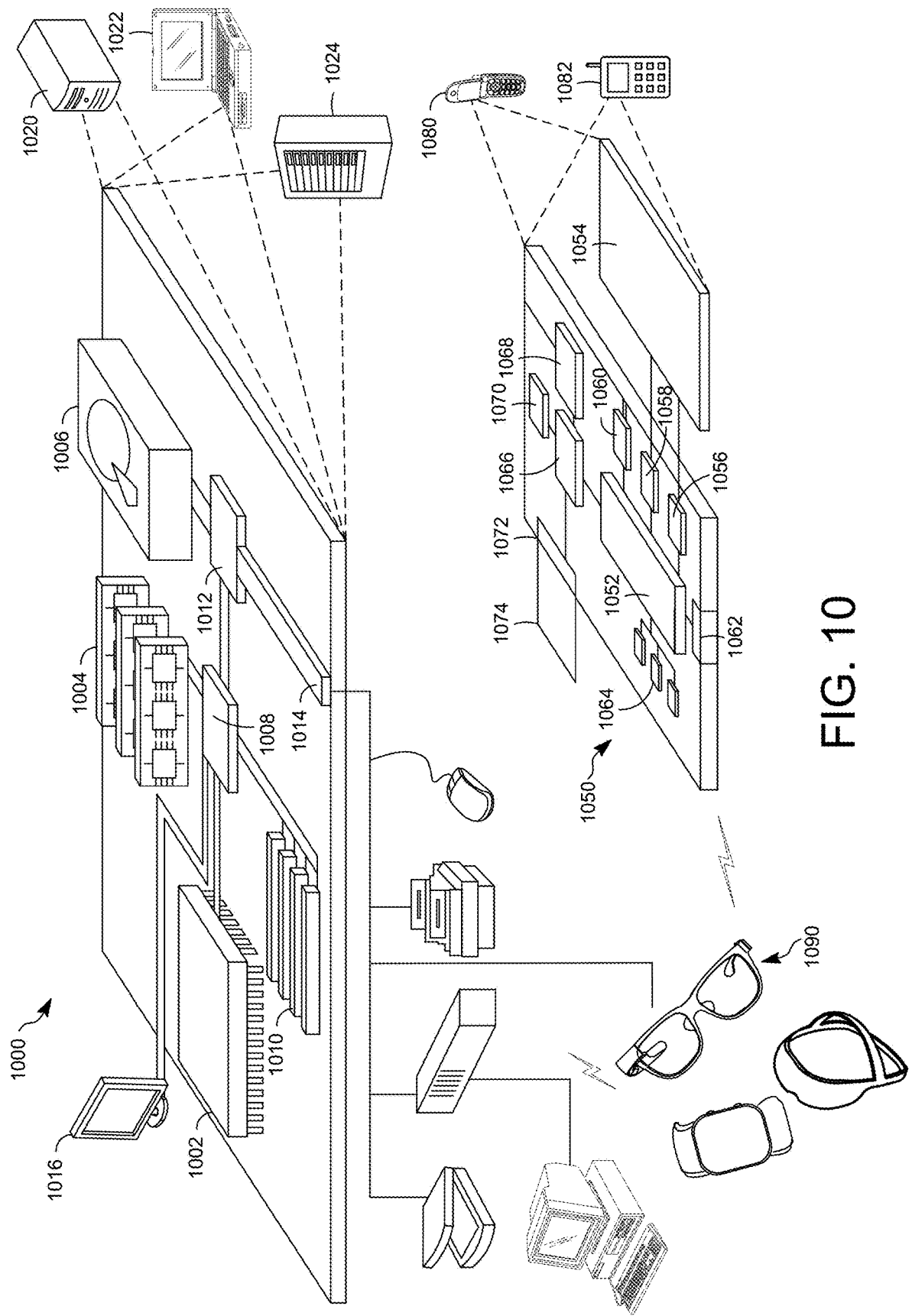
FIG. 10 shows an example of a computer device and a mobile computer device according to at least one example embodiment.

FIG. 10 illustrates an example of a computer device 1000 and a mobile computer device 1050, which can be used with the techniques described here (e.g., to implement a client computing device, a server computing device, and/or provider resources used in the initialization and/or calibration of a VIO system). The computing device 1000 includes a processor 1002, memory 1004, a storage device 1006, a high-speed interface 1008 connecting to memory 1004 and high-speed expansion ports 1010, and a low-speed interface 1012 connecting to low-speed bus 1014 and storage device 1006. Each of the components 1002, 1004, 1006, 1008, 1010, and 1012, are interconnected using various busses, and can be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high-speed interface 1008. In other implementations, multiple processors and/or multiple buses can be used, as appropriate, along with multiple memories and types of memory. Also, multiple computing devices 1000 can be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 can also be another form of computer-readable medium, such as a magnetic or optical disk.

The storage device 1006 is capable of providing mass storage for the computing device 1000. In one implementation, the storage device 1006 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The information carrier is a computer- or machine-readable medium, such as the memory 1004, the storage device 1006, or memory on processor 1002.

The high-speed controller 1008 manages bandwidth-intensive operations for the computing device 1000, while the low-speed controller 1012 manages lower bandwidth-intensive operations. Such allocation of functions is example only. In one implementation, the high-speed controller 1008 is coupled to memory 1004, display 1016 (e.g., through a graphics processor or accelerator), and to high-speed expansion ports 1010, which can accept various expansion cards (not shown). In the implementation, low-speed controller 1012 is coupled to storage device 1006 and low-speed expansion port 1014. The low-speed expansion port, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 1000 can be implemented in a number of different forms, as shown in the figure. For example, it can be implemented as a standard server 1020, or multiple times in a group of such servers. It can also be implemented as part of a rack server system 1024. In addition, it can be implemented in a personal computer such as a laptop computer 1022. Alternatively, components from computing device 1000 can be combined with other components in a mobile device (not shown), such as device 1050. Each of such devices can contain one or more of computing device 1000, 1050, and an entire system can be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 can also be provided with a storage device, such as a microdrive or other device, to provide additional storage. Each of the components 1050, 1052, 1064, 1054, 1066, and 1068, are interconnected using various buses, and several of the components can be mounted on a common motherboard or in other manners as appropriate.

The processor 1052 can execute instructions within the computing device 1050, including instructions stored in the memory 1064. The processor can be implemented as a chipset of chips that include separate and multiple analog and digital processors. The processor can provide, for example, for coordination of the other components of the device 1050, such as control of user interfaces, applications run by device 1050, and wireless communication by device 1050.

Processor 1052 can communicate with a user through control interface 1058 and display interface 1056 coupled to a display 1054. The display 1054 can be, for example, a TFT LCD (Thin-Film-Transistor Liquid Crystal Display), and LED (Light Emitting Diode) or an OLED (Organic Light Emitting Diode) display, or other appropriate display technology. The display interface 1056 can include appropriate circuitry for driving the display 1054 to present graphical and other information to a user. The control interface 1058 can receive commands from a user and convert them for submission to the processor 1052. In addition, an external interface 1062 can be provided in communication with processor 1052, so as to enable near area communication of device 1050 with other devices. External interface 1062 can provide, for example, for wired communication in some implementations, or for wireless communication in other implementations, and multiple interfaces can also be used.

The memory 1064 stores information within the computing device 1050. The memory 1064 can be implemented as one or more of a computer-readable medium or media, a volatile memory unit or units, or a non-volatile memory unit or units. Expansion memory 1074 can also be provided and connected to device 1050 through expansion interface 1072, which can include, for example, a SIMM (Single In-Line Memory Module) card interface. Such expansion memory 1074 can provide extra storage space for device 1050, or can also store applications or other information for device 1050. Specifically, expansion memory 1074 can include instructions to carry out or supplement the processes described above, and can include secure information also. Thus, for example, expansion memory 1074 can be provided as a security module for device 1050, and can be programmed with instructions that permit secure use of device 1050. In addition, secure applications can be provided via the SIMM cards, along with additional information, such as placing identifying information on the SIMM card in a non-hackable manner.

The memory can include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that can be received, for example, over transceiver 1068 or external interface 1062.

Device 1050 can communicate wirelessly through communication interface 1066, which can include digital signal processing circuitry where necessary. Communication interface 1066 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 1068. In addition, short-range communication can occur, such as using a Bluetooth, Wi-Fi, or other such transceiver (not shown). In addition, GPS (Global Positioning System) receiver module 1070 can provide additional navigation- and location-related wireless data to device 1050, which can be used as appropriate by applications running on device 1050.

Device 1050 can also communicate audibly using audio codec 1060, which can receive spoken information from a user and convert it to usable digital information. Audio codec 1060 can likewise generate audible sound for a user, such as through a speaker, e.g., in a handset of device 1050. Such sound can include sound from voice telephone calls, can include recorded sound (e.g., voice messages, music files, etc.) and can also include sound generated by applications operating on device 1050.

The computing device 1050 can be implemented in a number of different forms, as shown in the figure. For example, it can be implemented as a cellular telephone 1080. It can also be implemented as part of a smartphone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in the figure can include sensors that interface with an AR/VR headset/HMD device 1090 to generate an augmented and/or virtual environment for viewing inserted content within the physical space. For example, one or more sensors included on a computing device 1050 or other computing device depicted in the figure, can provide input to the AR headset 1090 or in general, provide input to an AR space. The sensors can include, but are not limited to, a touchscreen, accelerometers, gyroscopes, pressure sensors, biometric sensors, temperature sensors, humidity sensors, and ambient light sensors. The computing device 1050 can use the sensors to determine an absolute position and/or a detected rotation of the computing device in the AR space that can then be used as input to the AR space. For example, the computing device 1050 can be incorporated into the AR space as a virtual object, such as a controller, a laser pointer, a keyboard, a weapon, etc. Positioning of the computing device/virtual object by the user when incorporated into the AR space can allow the user to position the computing device so as to view the virtual object in certain manners in the AR space. For example, if the virtual object represents a laser pointer, the user can manipulate the computing device as if it were an actual laser pointer. The user can move the computing device left and right, up and down, in a circle, etc., and use the device in a similar fashion to using a laser pointer. In some implementations, the user can aim at a target location using a virtual laser pointer. References to AR/VR can refer to one or both of AR and VR. For example, reference to an AR/VR device can include an AR device, a VR device, and/or an AR and VR device.

In some implementations, one or more input devices included on, or connect to, the computing device 1050 can be used as input to the AR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1050 when the computing device is incorporated into the AR space can cause a particular action to occur in the AR space.

In some implementations, a touchscreen of the computing device 1050 can be rendered as a touchpad in AR space. A user can interact with the touchscreen of the computing device 1050. The interactions are rendered, in AR headset 1090 for example, as movements on the rendered touchpad in the AR space. The rendered movements can control virtual objects in the AR space.

In some implementations, one or more output devices included on the computing device 1050 can provide output and/or feedback to a user of the AR headset 1090 in the AR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 1050 can appear as another object in a computer-generated, 3D environment. Interactions by the user with the computing device 1050 (e.g., rotating, shaking, touching a touchscreen, swiping a finger across a touch screen) can be interpreted as interactions with the object in the AR space. In the example of the laser pointer in an AR space, the computing device 1050 appears as a virtual laser pointer in the computer-generated, 3D environment. As the user manipulates the computing device 1050, the user in the AR space sees movement of the laser pointer. The user receives feedback from interactions with the computing device 1050 in the AR environment on the computing device 1050 or on the AR headset 1090. The user's interactions with the computing device can be translated to interactions with a user interface generated in the AR environment for a controllable device.

In some implementations, a computing device 1050 can include a touchscreen. For example, a user can interact with the touchscreen to interact with a user interface for a controllable device. For example, the touchscreen can include user interface elements such as sliders that can control properties of the controllable device.

Computing device 1000 is intended to represent various forms of digital computers and devices, including, but not limited to laptops, desktops, workstations, personal digital assistants, servers, blade servers, mainframes, and other appropriate computers. Computing device 1050 is intended to represent various forms of mobile devices, such as personal digital assistants, cellular telephones, smartphones, and other similar computing devices. The components shown here, their connections and relationships, and their functions, are meant to be examples only, and are not meant to limit implementations of the inventions described and/or claimed in this document.

A number of embodiments have been described. Nevertheless, it will be understood that various modifications can be made without departing from the spirit and scope of the specification.

In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

Further to the descriptions above, a user can be provided with controls allowing the user to make an election as to both if and when systems, programs, or features described herein can enable collection of user information (e.g., information about a user's social network, social actions, or activities, profession, a user's preferences, or a user's current location), and if the user is sent content or communications from a server. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over what information is collected about the user, how that information is used, and what information is provided to the user.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details can be made. Any portion of the apparatus and/or methods described herein can be combined in any combination, except mutually exclusive combinations. The implementations described herein can include various combinations and/or sub-combinations of the functions, components and/or features of the different implementations described.

While example embodiments can include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Some of the above example embodiments are described as processes or methods depicted as flowcharts. Although the flowcharts describe the operations as sequential processes, many of the operations can be performed in parallel, concurrently or simultaneously. In addition, the order of operations can be re-arranged. The processes can be terminated when their operations are completed, but can also have additional steps not included in the figure. The processes can correspond to methods, functions, procedures, subroutines, subprograms, etc.

Methods discussed above, some of which are illustrated by the flow charts, can be implemented by hardware, software, firmware, middleware, microcode, hardware description languages, or any combination thereof. When implemented in software, firmware, middleware or microcode, the program code or code segments to perform the necessary tasks can be stored in a machine or computer readable medium such as a storage medium. A processor(s) can perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. can be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements can be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted can occur out of the order noted in the figures. For example, two figures shown in succession can in fact be executed concurrently or can sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that can be implemented as program modules or functional processes include routines, programs, objects, components, data structures, etc., that perform particular tasks or implement particular abstract data types and can be described and/or implemented using existing hardware at existing structural elements. Such existing hardware can include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium can be magnetic (e.g., a floppy disk or a hard drive) or optical (e.g., a compact disk read only memory, or CD ROM), and can be read only or random access. Similarly, the transmission medium can be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method comprising:
   receiving a depth data estimated using data generated based on a single image and data received from a movement sensor as input to a function applied to the data, the depth data including a smaller number of depth values than a number of values corresponding to a pixel of the image;
   generating an alignment parameter based on the depth data;

defining a second calibration state based on a first calibration state and the alignment parameter, wherein the first calibration state is associated with a manufacture of an image and movement sensor and the second calibration state is associated with a user operation of the image and movement sensor;

generating scale parameters and shift parameters based on features associated with the data received from the image and movement sensor; and adjusting the image and movement sensor based on the second calibration state, the scale parameters and the shift parameters.

2. The method of claim 1, further comprising:
generating a gradient data based on the depth data and the image data, wherein the alignment parameter is generated based on the gradient data.

3. The method of claim 1, wherein the depth data is estimated using a neural network.

4. The method of claim 1, wherein the adjusting of the image and movement sensor includes spatially aligning and temporally aligning data generated by an image sensor with data generated by a movement sensor.

5. The method of claim 4, wherein
the second calibration state is a visual inertial (VI) calibration state,
the movement sensor is an inertial measurement unit (IMU) sensor, and
the VI calibration state is generated based on IMU sensor data, image data generated by the image sensor, and optical flow measurements associated with the image data.

6. The method of claim 1, further comprising:
one of estimating, by a neural network, a depth based on the single image or a set of images and movement sensor data or generating, using an image processing operation, the depth based on one of the image or the set of images;
storing the depth in a memory; and
selecting the stored depth as the received depth data.

7. The method of claim 6, further comprising:
generating gravity aligned image data by rotating image data based on IMU sensor data, wherein
the estimating of the depth uses the gravity aligned image data as input to the neural network and the gravity aligned image data is rotated before the depth is estimated; or
the generating of the depth uses the gravity aligned image data as input to the image processing operation and the generating of the depth includes rotating the gravity aligned image data.

8. The method of claim 7, further comprising:
generating an image plane based on the image data;
determining a gravity vector based on the IMU sensor data and the image plane;
determining a ground plane vector in an opposite direction of the gravity vector;
generating gravity vector parameters based on the gravity vector;
generating a ground plane based on the ground plane vector;
predicting, by the neural network, a surface normal data including a plurality of pixels representing a surface normal direction in a camera frame;
determining a triplet of points in the image plane based on the features associated with the image data;
generating a frame plane based on a projection of the triplet of points onto the ground plane;

determining a frame plane normal bounded by the surface normal data;
generating triplet normal parameters based on the frame plane normal; and
modifying the scale parameters and the shift parameters based on the gravity vector parameters and the triplet normal parameters.

9. The method of claim 1, wherein the depth data is one of a plurality of depth data associated with a plurality of image frames, the method further comprising:
performing outlier rejection based on a residual error across the plurality of depth data.

10. A visual inertial (VI) system comprising:
at least one processor; and
at least one memory including computer program code, the at least one memory and the computer program code configured to, with the at least one processor, cause the VI system to:
receive a depth data estimated using data generated based a single image and data received from a movement sensor as input to a function applied to the data, the depth data including a smaller number of depth values than a number of values corresponding to a pixel of the image;
generate an alignment parameter based on the depth data;
define a second calibration state based on a first calibration state and the alignment parameter, wherein the first calibration state is associated with a manufacture of an image and movement sensor and the second calibration state is associated with a user operation of the image and movement sensor;
generate scale parameters and shift parameters based on features associated with the data received from the image and movement sensor; and
adjust the image and movement sensor based on the second calibration state, the scale parameters and the shift parameters.

11. The VI system of claim 10, wherein the computer program code further causes the VI system to:
generate a gradient data based on the depth data and the image data, wherein the alignment parameter is generated based on the gradient data.

12. The VI system of claim 10, wherein the depth data is estimated using a neural network.

13. The VI system of claim 10, wherein the adjusting of the image and movement sensor includes spatially aligning and temporally aligning data generated by an image sensor with data generated by a movement sensor.

14. The VI system of claim 13, wherein
The second calibration state is a visual inertial (VI) calibration state,
the movement sensor is an inertial measurement unit (IMU) sensor, and
the VI calibration state is generated based on IMU sensor data, image data generated by the image sensor, and optical flow measurements associated with the image data.

15. The VI system of claim 10, wherein the computer program code further causes the VI system to:
one of estimate, by a neural network, a depth based on the single image or a set of images and movement sensor data or generate, using an image processing operation, the depth based on one of the image or the set of images;
store the depth in a memory; and
select the stored depth as the received depth map data.

16. The VI system of claim 15, wherein the computer program code further causes the VI system to:
  generate gravity aligned image data by rotating image data based on IMU sensor data, wherein
    the estimating of the depth uses the gravity aligned image data as input to the neural network and the gravity aligned image data is rotated before the depth is estimated; or
    the generating of the depth uses the gravity aligned image data as input to the image processing operation and the generating of the depth includes rotating the gravity aligned image data.

17. The VI system of claim 16, wherein the computer program code further causes the VI system to:
  generate an image plane based on the image data;
  determine a gravity vector based on the IMU sensor data and the image plane;
  determine a ground plane vector in an opposite direction of the gravity vector;
  generate gravity vector parameters based on the gravity vector;
  generate a ground plane based on the ground plane vector;
  predict, by the neural network, a surface normal data including a plurality of pixels representing a surface normal direction in a camera frame;
  determine a triplet of points in the image plane based on the features associated with the image data;
  generate a frame plane based on a projection of the triplet of points onto the ground plane;
  determine a frame plane normal bounded by the surface normal data;
  generate triplet normal parameters based on the frame plane normal; and
  modify the scale parameters and the shift parameters based on the gravity vector parameters and the triplet normal parameters.

18. The VI system of claim 10, wherein the depth data is one of a plurality of depth data associated with a plurality of image frames and the computer program code further causes the VI system to:
  perform outlier rejection based on a residual error across the plurality of depth data.

19. A non-transitory computer-readable medium storing executable instructions that when executed by at least one processor cause the at least one processor to:
  receive a depth data estimated using data generated based single image and movement sensor as input to a function applied to the data, the depth data including a smaller number of depth values than a number of values corresponding to a pixel of the image;
  generate an alignment parameter based on the depth data;
  define a second calibration state based on a first calibration state and the alignment parameter, wherein the first calibration state is associated with a manufacture of an image and movement sensor and the second calibration state is associated with a user operation of the image and movement sensor;
  generate scale parameters and shift parameters based on features associated with the data received from the image and movement sensor; and
  adjust the image and movement sensor based on the second calibration state, the scale parameters and the shift parameters.

20. The non-transitory computer-readable medium of claim 19, wherein the executable instructions further causes the processor to:
  one of estimate, by a neural network, a depth based on the single image or a set of images and movement sensor data or generate, using an image processing operation, the depth based on one of the image or the set of images;
  store the depth in a memory;
  select the stored depth as the received depth map data;
  generate an image plane based on the image;
  determine a gravity vector based on inertial measurement unit (IMU) sensor data and the image plane;
  determine a ground plane vector in an opposite direction of the gravity vector;
  generate gravity vector parameters based on the gravity vector;
  generate a ground plane based on the ground plane vector;
  predict, by the neural network, a surface normal data including a plurality of pixels representing a surface normal direction in a camera frame;
  determine a triplet of points in the image plane based on the features associated with the image data;
  generate a frame plane based on a projection of the triplet of points onto the ground plane;
  determine a frame plane normal bounded by the surface normal-map data;
  generate triplet normal parameters based on the frame plane normal; and
  modify the scale parameters and the shift parameters based on the gravity vector parameters and the triplet normal parameters.

* * * * *

UNITED STATES PATENT AND TRADEMARK OFFICE
CERTIFICATE OF CORRECTION

| | | |
|---|---|---|
| PATENT NO. | : 12,366,590 B2 | Page 1 of 1 |
| APPLICATION NO. | : 17/648572 | |
| DATED | : July 22, 2025 | |
| INVENTOR(S) | : Zhou et al. | |

It is certified that error appears in the above-identified patent and that said Letters Patent is hereby corrected as shown below:

On the Title Page

On Page 2, Column 2, in Item (56), under "OTHER PUBLICATIONS", Line 10, delete "Juang" and insert -- Huang --, therefor.

In the Claims

In Column 30, Claim 10, Line 20, delete "based" and insert -- based on --, therefor.

In Column 30, Claim 14, Line 51, delete "The" and insert -- the --, therefor.

In Column 30, Claim 15, Line 67, delete "depth map" and insert -- depth --, therefor.

In Column 31, Claim 19, Line 46, delete "based" and insert -- based on a --, therefor.

In Column 32, Claim 20, Line 25, delete "depth map" and insert -- depth --, therefor.

In Column 32, Claim 20, Line 42, delete "normal-map" and insert -- normal --, therefor.

Signed and Sealed this
Eighteenth Day of November, 2025

John A. Squires
*Director of the United States Patent and Trademark Office*